Figure 1:
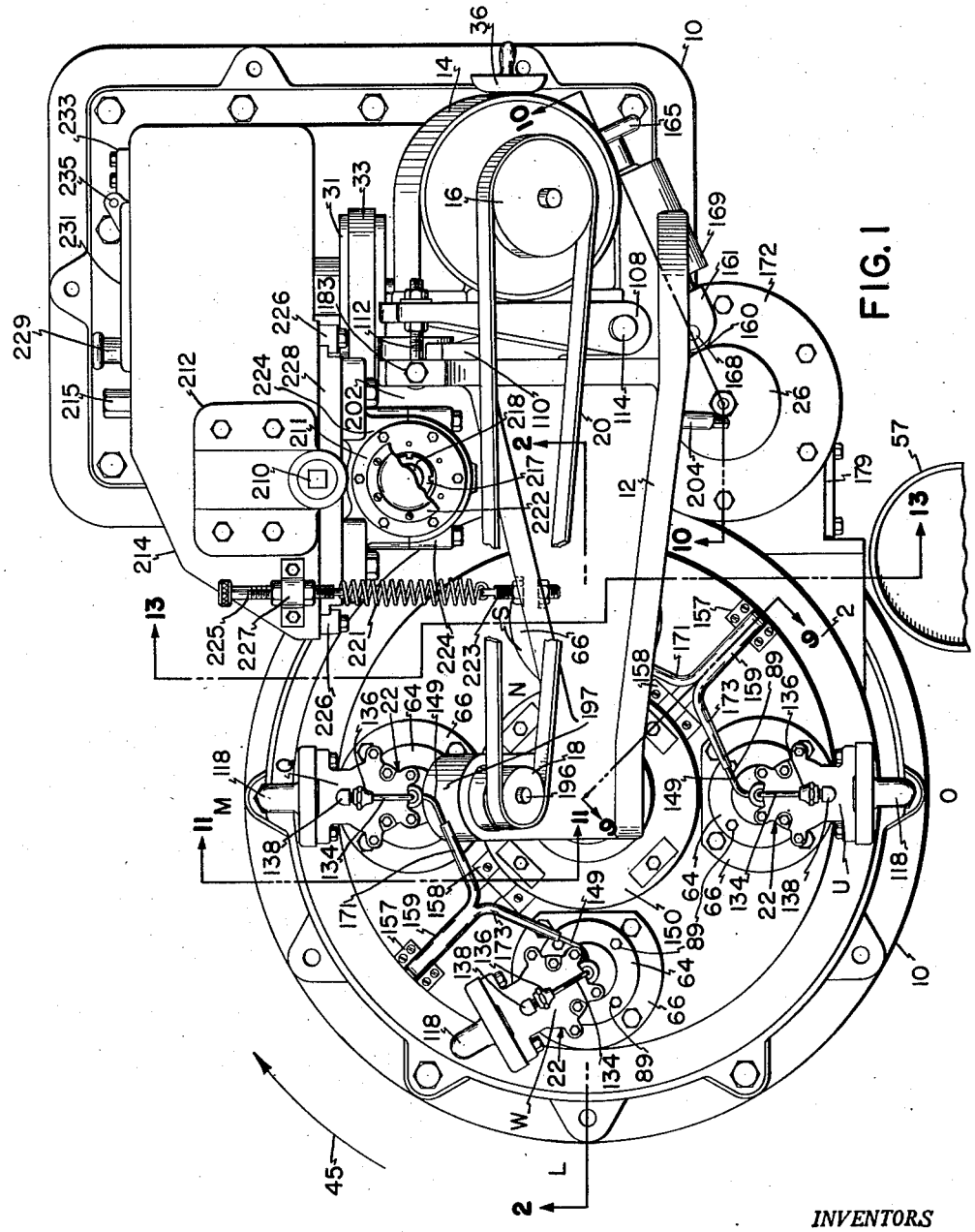

Nov. 6, 1951  G. R. CONSTANTINE ET AL  2,573,692
MACHINE FOR MAKING WEDGE HEELS
Filed Aug. 24, 1946  12 Sheets-Sheet 1

INVENTORS
ARTHUR F. BALL
GEORGE R. CONSTANTINE
BY
David Rines
ATTORNEY

INVENTORS
ARTHUR F. BALL
GEORGE R. CONSTANTINE
BY
ATTORNEY

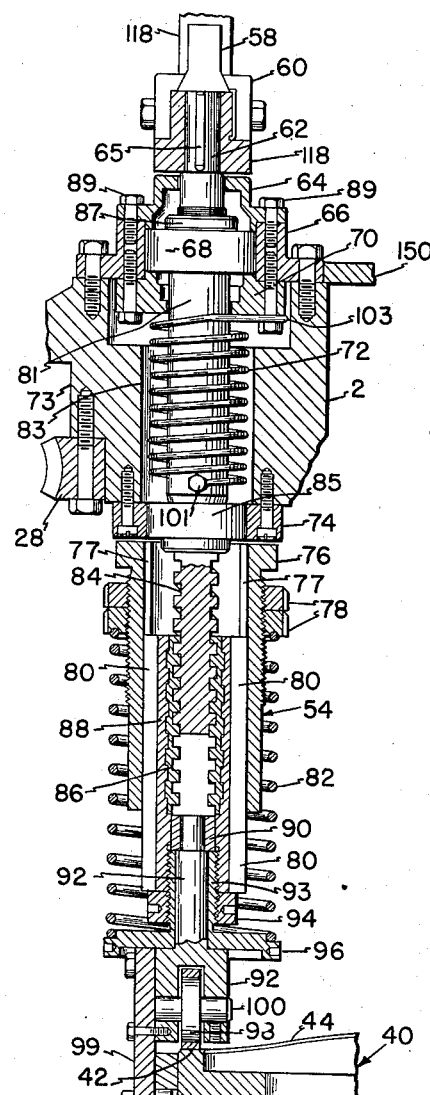
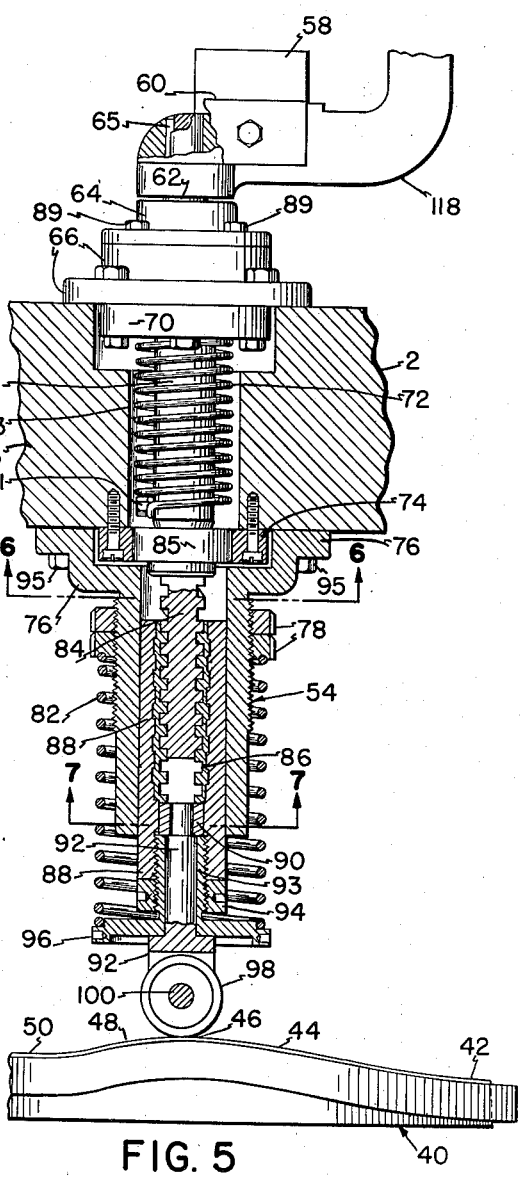
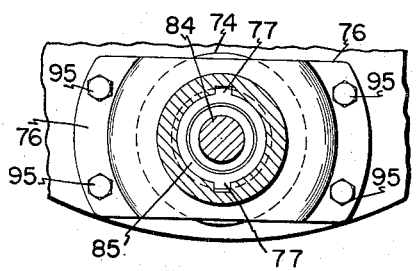
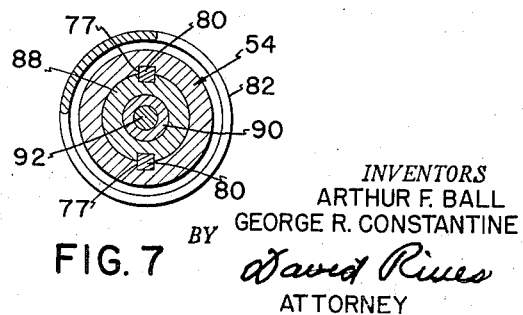
Nov. 6, 1951     G. R. CONSTANTINE ET AL     2,573,692
MACHINE FOR MAKING WEDGE HEELS
Filed Aug. 24, 1946     12 Sheets-Sheet 4
FIG. 4
FIG. 5
FIG. 6
FIG. 7
INVENTORS
ARTHUR F. BALL
GEORGE R. CONSTANTINE
BY David Rines
ATTORNEY INVENTORS
ARTHUR F. BALL
GEORGE R. CONSTANTINE
BY David Rines
ATTORNEY

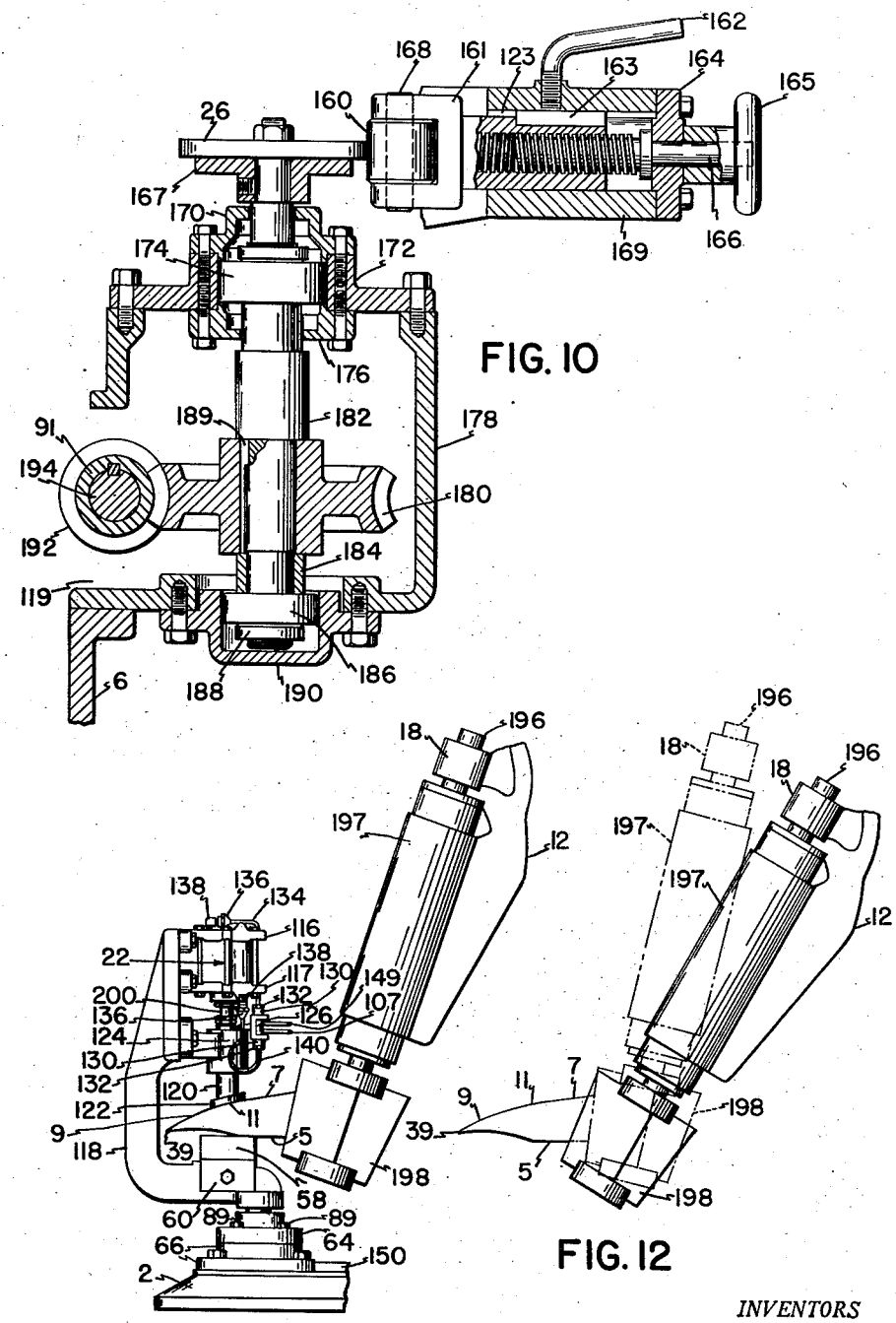

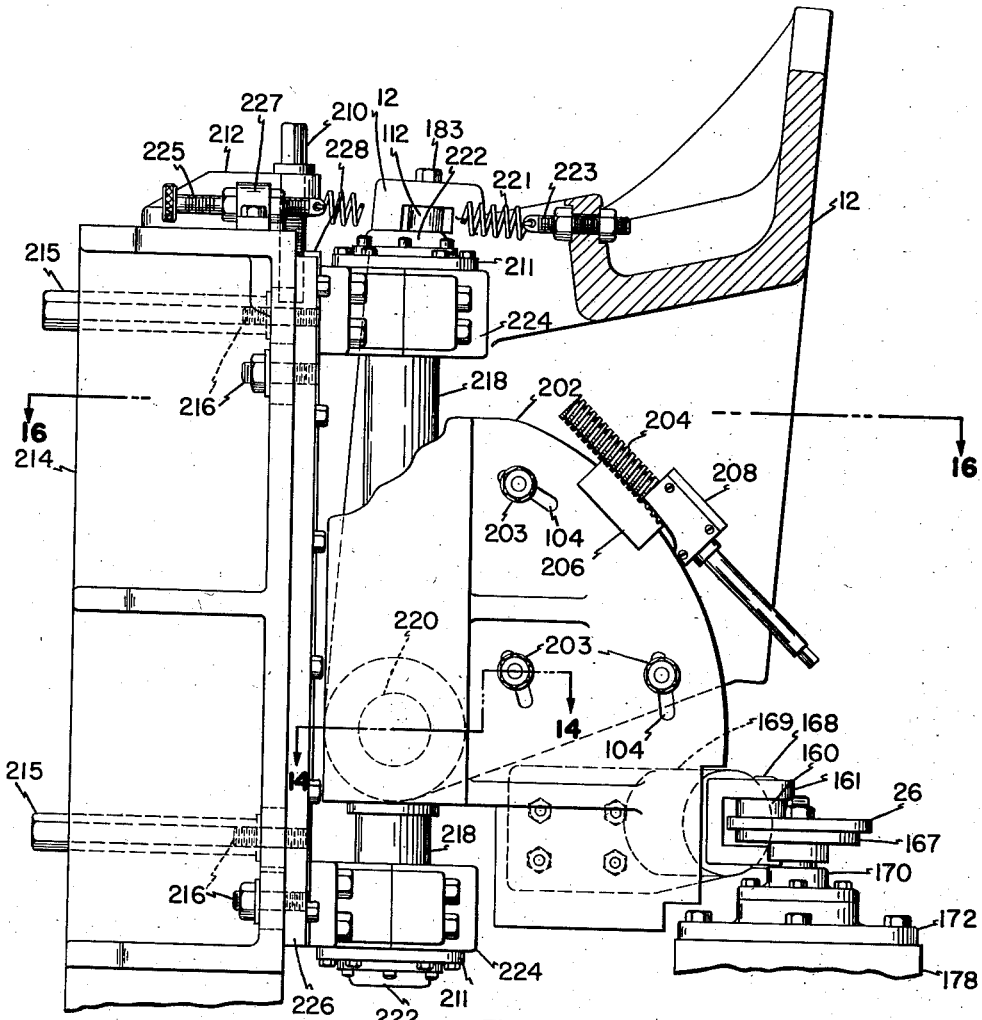
FIG. 13
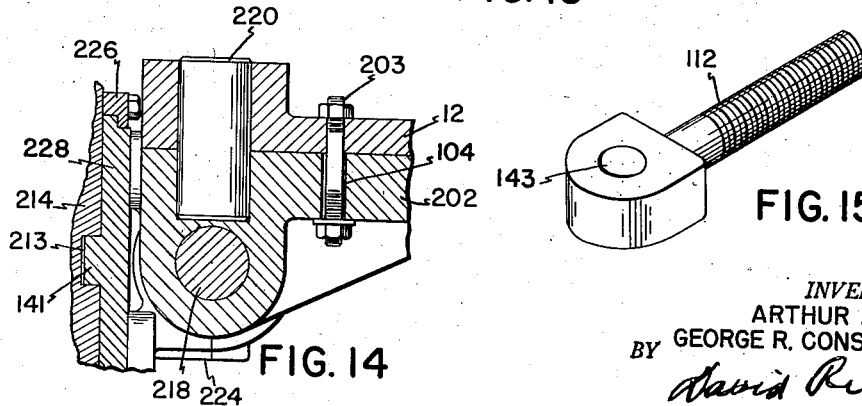
FIG. 14
FIG. 15
INVENTORS
ARTHUR F. BALL
BY GEORGE R. CONSTANTINE
ATTORNEY

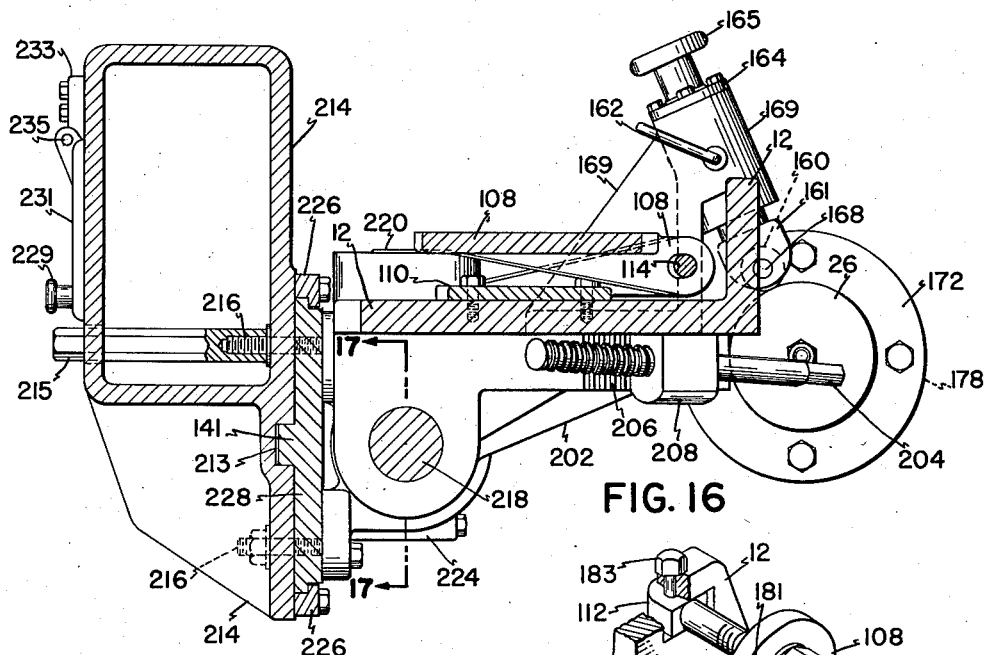
FIG. 16
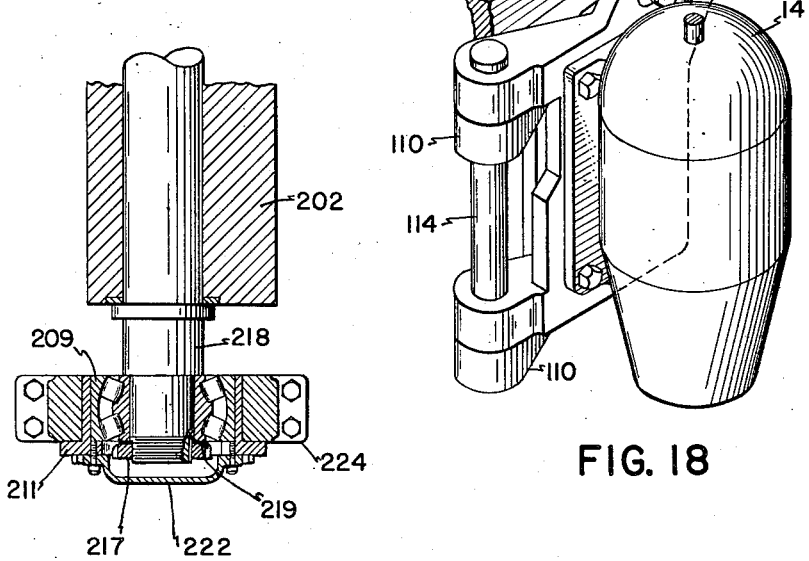
FIG. 17
FIG. 18
INVENTORS
ARTHUR F. BALL
BY GEORGE R. CONSTANTINE
ATTORNEY Nov. 6, 1951 G. R. CONSTANTINE ET AL 2,573,692
MACHINE FOR MAKING WEDGE HEELS
Filed Aug. 24, 1946 12 Sheets-Sheet 10

INVENTORS
ARTHUR F. BALL
GEORGE R. CONSTANTINE
BY
ATTORNEY

Nov. 6, 1951  G. R. CONSTANTINE ET AL  2,573,692
MACHINE FOR MAKING WEDGE HEELS
Filed Aug. 24, 1946  12 Sheets-Sheet 11

INVENTORS
ARTHUR F. BALL
GEORGE R. CONSTANTINE
BY
ATTORNEY

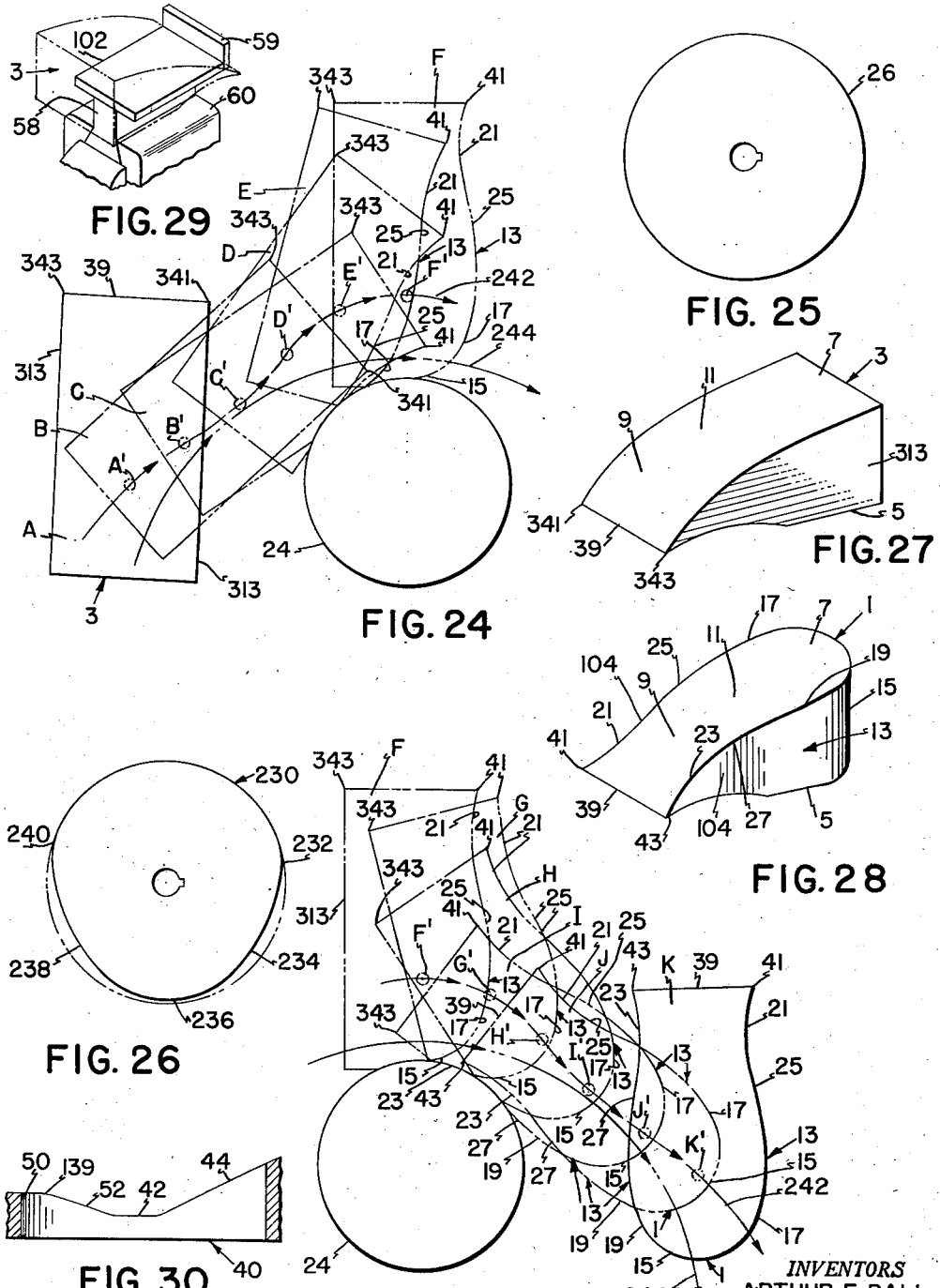

Patented Nov. 6, 1951

2,573,692

UNITED STATES PATENT OFFICE 2,573,692

MACHINE FOR MAKING WEDGE HEELS

George R. Constantine and Arthur F. Ball, Haverhill, Mass., assignors to The Service Wood Heel Co., Lawrence, Mass., a corporation of Massachusetts Application August 24, 1946, Serial No. 692,760

47 Claims. (Cl. 144—142)

The present invention relates to machines of the type provided with a work support having a plurality of stations at one or more of which work is supplied for presentation to an operating member or members at another station or stations. Though the invention has more general fields of usefulness, it is particularly related to machines provided with a cutter-operating member for turning wedge-heel blanks or blocks. As specified in a number of the claims herein, however, the invention is not restricted to machines for turning wedge-heel blanks or blocks, or even to machines for turning or otherwise cutting heel blanks or blocks of any other type. Many of the features of the present invention, on the contrary, are applicable for use with machines for cutting or otherwise operating upon articles other than heel blanks or blocks.

Wedge heels are fashioned from heel blanks that, like other articles of manufacture, are made of wood, cork and other materials. Their manufacture, however, presents problems that are ordinarily not met with in the manufacture of other articles, though some of the problems do exist in industries additional to the heel-making industry. Many of the problems connected with the manufacture of wedge heels, indeed, are non-analogous even to those connected with the manufacture of even other types of heels. This is because the shapes of wedge heels are so different from the shapes of other heels, and because what is required of them under conditions of actual use is also different.

A wedge heel should conform accurately to the shape of the wearer's foot. No two human feet, however, are exactly alike. In theory, therefore, it would be necessary, in order to fulfill the requirements of different wearers, to shape a separate wedge heel properly to each different foot. As this theoretical end, of course, is practically impossible of actual attainment, a compromise is attempted, with the object in view of satisfactorily meeting the needs of a great majority of the people. It suffices, toward the attainment of this end, to build a number of standard wedge heels, each conforming in shape approximately to the feet of many wearers. In order to attain even this practical compromise between theory and actuality, however, the number of standard wedge heels required to be manufactured is necessarily rather large.

It is an object of the present invention to solve a few of the above-described problems.

A further object is to provide a new and improved machine for operating on wood-heel blanks or blocks, and more particularly wedge-heel blanks or blocks.

With the end in view of avoiding the necessity for providing as many separate machines as there are different standard wedge heels to be manufactured, another object of the invention is to provide a new and improved machine that shall be readily adaptable to the manufacture of a very large number of sizes and shapes of the numerous standard wedge heels that are ordinarily manufactured.

A further object of the invention is to provide a novel multi-station machine of the above-described character.

Multi-station machines of the rotary type have heretofore been used for operating upon other than wedge-heel blanks. The work blanks have been supplied to a rotatable-table work support at one station at which, or at some other predetermined point, the work blanks have become clamped to the work support, and thereafter they have been carried to a cutter at another station. In many of these machines, the operation has been controlled by a cam that has rotated once corresponding to each rotation of the rotatable work support.

With the end in view of simplifying and improving upon machines of the above-described character, still another object of the present invention is to provide a new and improved multi-station machine the controlling cam of which shall operate throughout a complete cycle once corresponding to the operation of the machine between successive stations.

Another object still is to provide a new and improved machine of the above-described character the cutter or other operating member of which shall operate throughout a complete cycle corresponding to each presentation of a work blank thereto. A very important feature of the invention, indeed, resides in effecting a complete cycle of operation of a cutter during a correspondingly complete rotation of a suitably shaped rotatable controlling cam. According to the preferred embodiment of the invention that is illustrated and described herein, the proper shapes are imparted to the successive work blanks during the complete cycle of cutter operation while the work support carries the work blank to and past the cutter station from the station next adjacent thereto.

Still another object of the invention is to render the machine adjustable, so as to provide for different sizes, shapes, and inclinations of heels or other articles to be produced, and for wear of the machine; and, in particular, to provide for ready replacement of the controlling cam whenever it is desired to obtain a different heel or other article shape, as well as to obtain proper operation of the cutter in conjunction with the replaced cam.

Other and further objects will be explained hereinafter, and will be more particularly pointed out in the appended claims.

Figure 2:
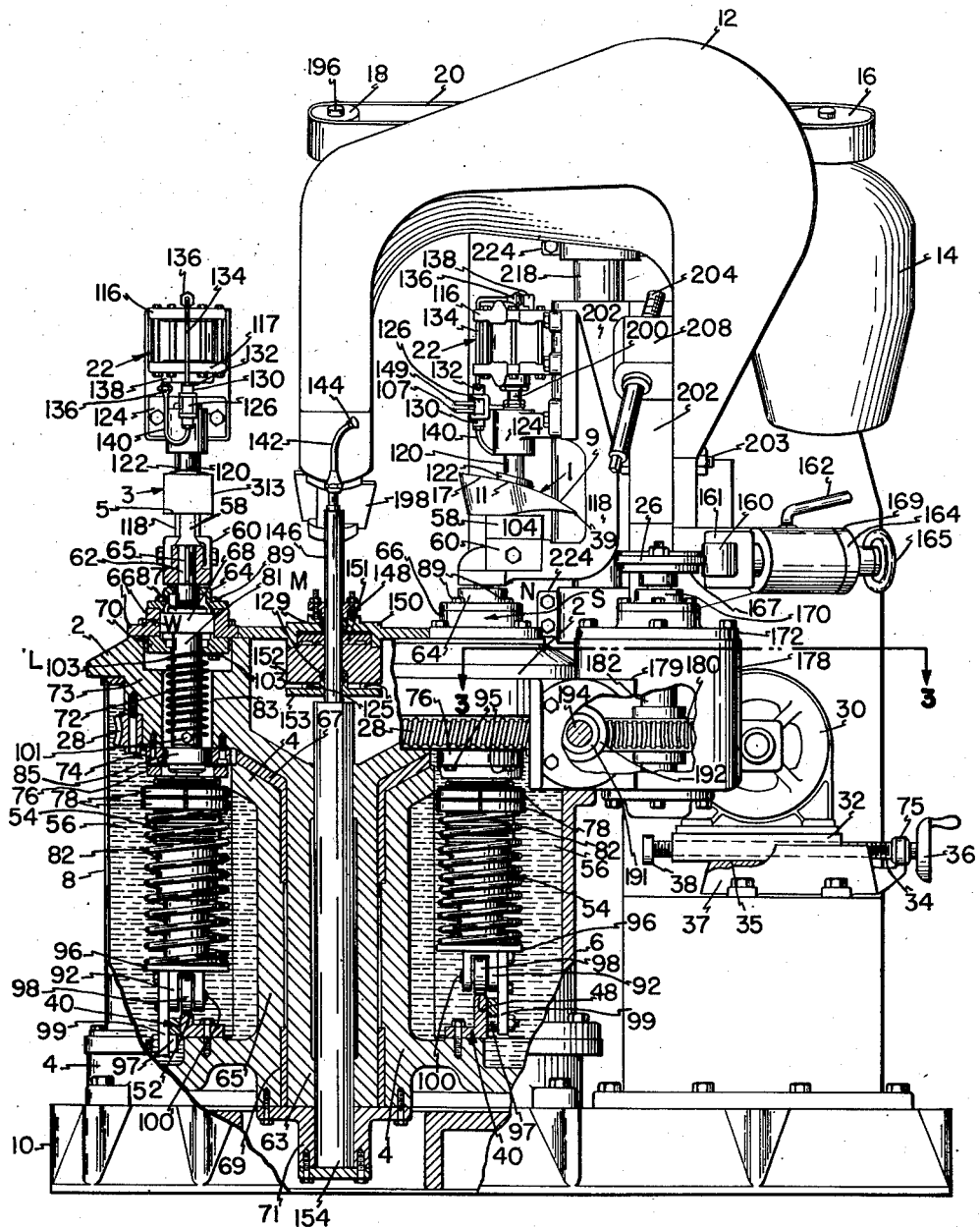
Figure 3:
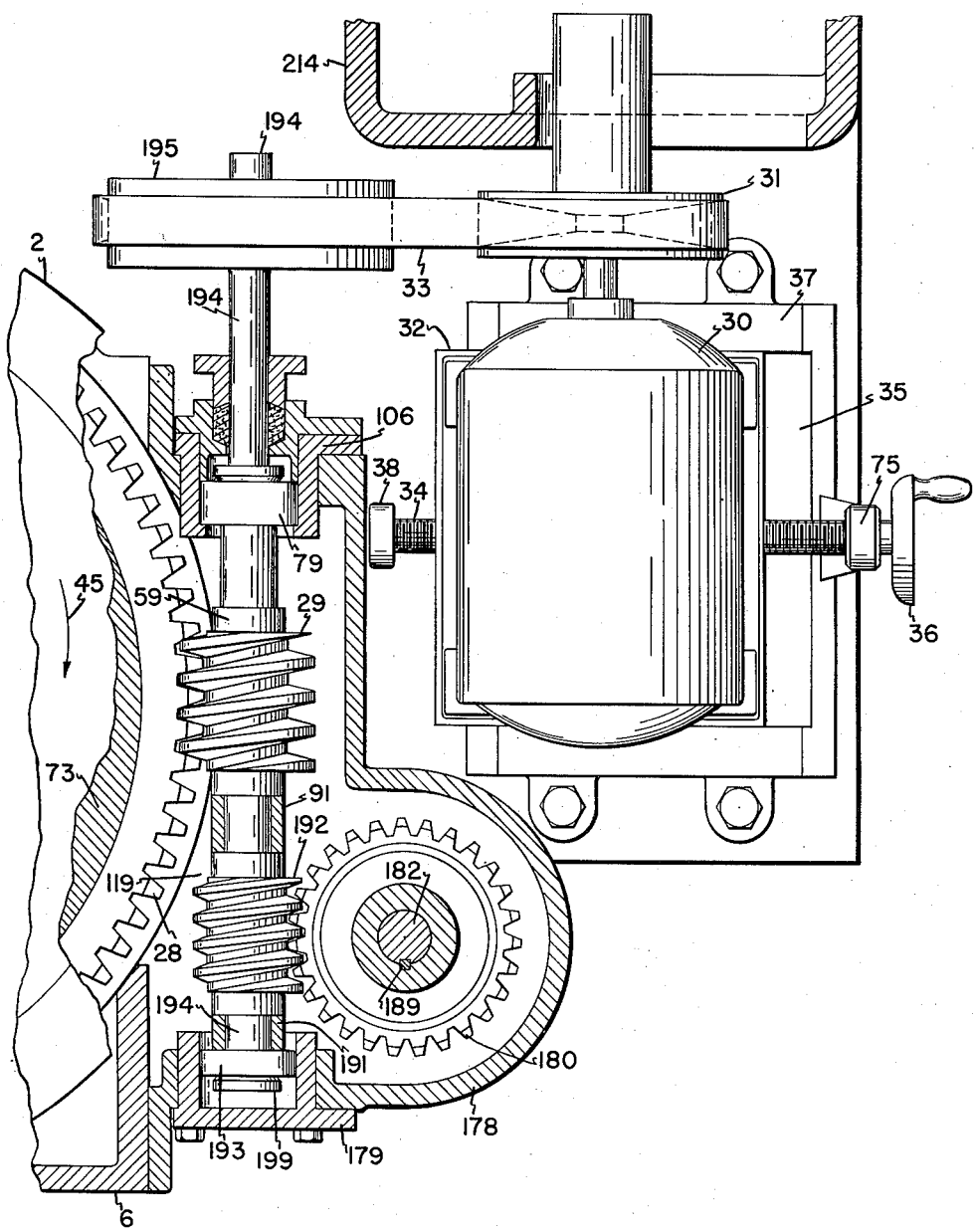
Figure 8:
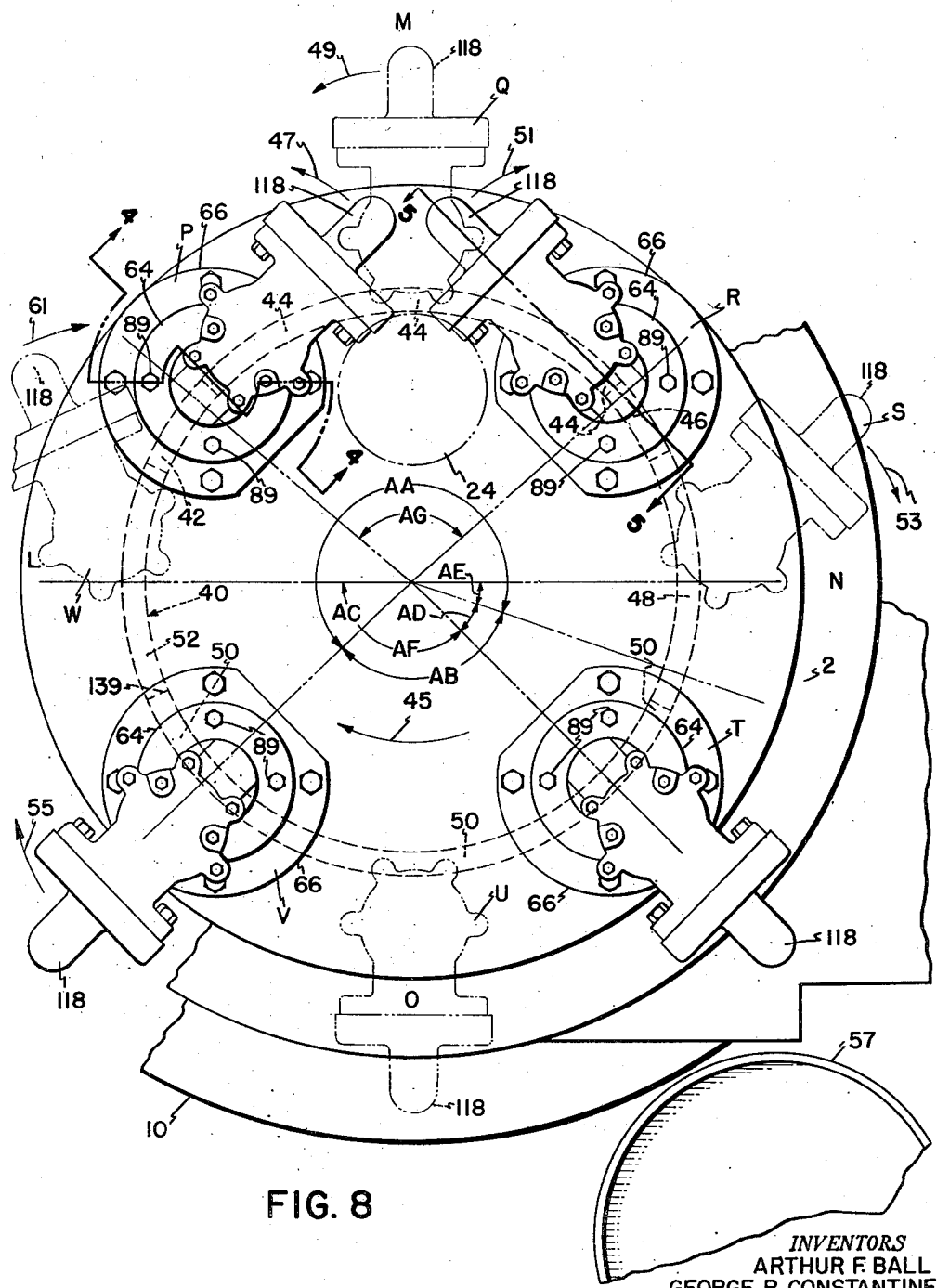
Figure 9:
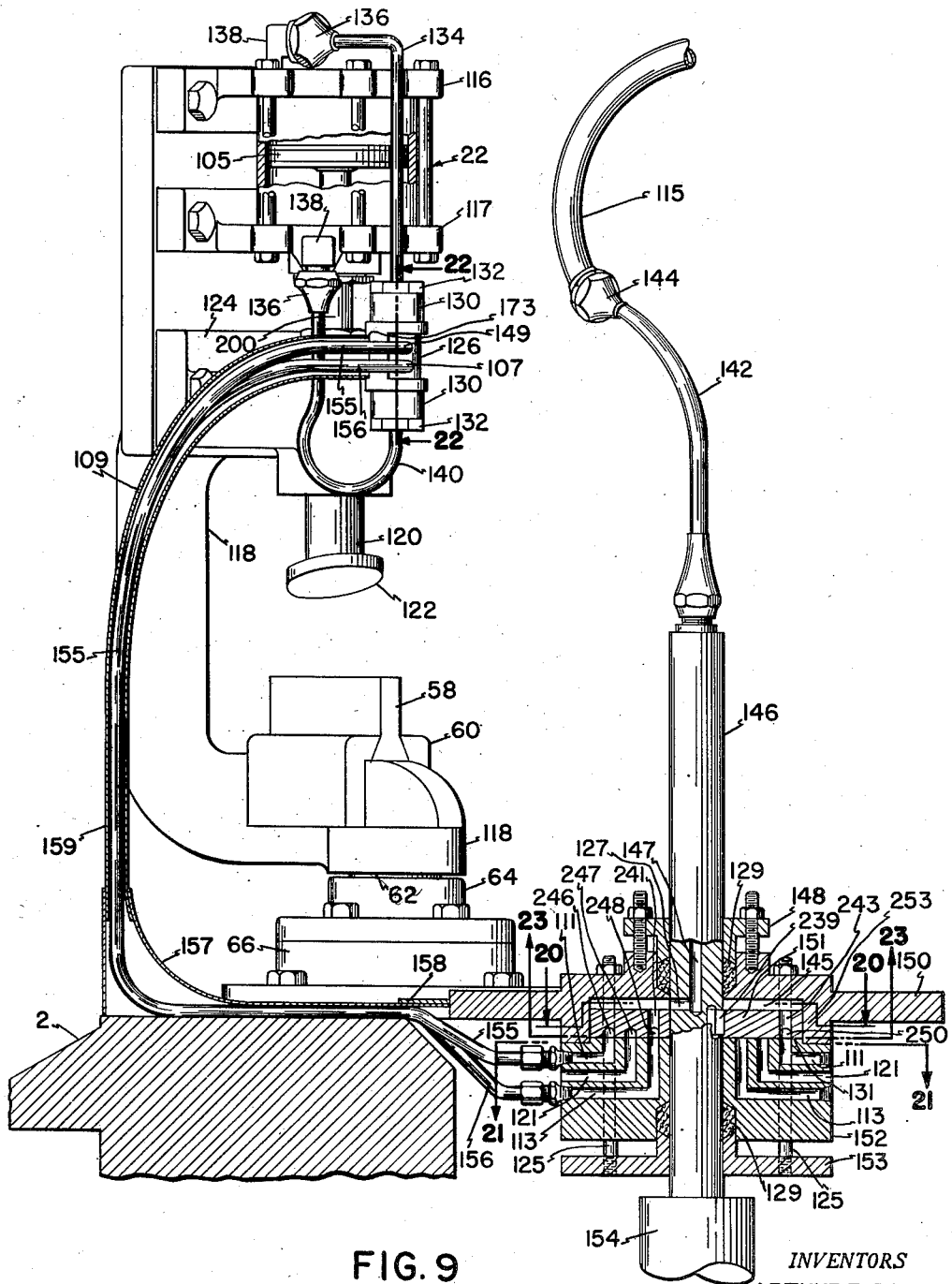
Figure 19:
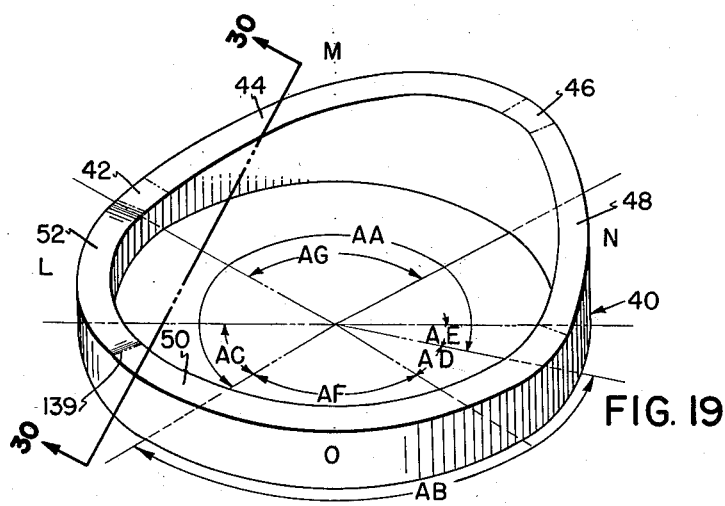

The invention will now be more fully described in connection with the accompanying drawings, in which Fig. 1 is a plan of a machine embodying the invention, in preferred form, parts being broken away, for clearness; Fig. 2 is a front elevation, partly broken away, for clearness, and partly in longitudinal vertical section upon the line 2—2 of Fig. 1, looking in the direction of the arrows, the scale being larger than in Fig. 1; Fig. 3 is a horizontal section, upon a still larger scale, taken upon the line 3—3 of Fig. 2, looking downward in the direction of the arrows, parts being broken away, for clearness; Figs. 4 and 5 are vertical sections taken upon the lines 4—4 and 5—5, respectively, of Fig. 8, looking in the directions of the respective arrows; Figs. 6 and 7 are horizontal sections taken upon the lines 6—6 and 7—7, respectively, of Fig. 5, looking upward in the direction of the arrows; Fig. 8 is a plan similar to Fig. 1, but upon a larger scale, of the rotatable-table work support, with parts shown by dashed lines for explanatory purposes; Figs. 9, 10 and 11 are vertical sections taken upon the lines 9—9, 10—10 and 11—11, respectively, of Fig. 1, looking in the directions of the respective arrows, but upon a larger scale, only one of the jacks and its connections, however, being shown in Fig. 9; Fig. 12 is a view similar to Fig. 11, but illustrating by full and dashed lines different positions to which the cutter may be adjusted; Fig. 13 is a vertical transverse section taken upon the line 13—13 of Fig. 1, looking in the direction of the arrows, but upon a larger scale, parts being broken away, for clearness; Fig. 14 is a horizontal section taken upon the line 14—14 of Fig. 13, looking downward in the direction of the arrows; Fig. 15 is a correspondingly enlarged perspective of a detail; Fig. 16 is a horizontal section taken upon the line 16—16 of Fig. 13, looking downward in the direction of the arrows; Fig. 17 is a vertical section taken upon the line 17—17 of Fig. 16, looking in the direction of the arrows; Fig. 18 is a perspective of a detail; Fig. 19 is a perspective of a preferred clamping-jack-controlling cam, but upon a smaller scale than in Fig. 8; Figs. 20, 21, 22 and 23 are sections taken upon the lines 20—20, 21—21, 22—22 and 23—23, respectively, of Fig. 9, looking in the directions of the respective arrows, but upon a larger scale, the cam of Fig. 19 being included in Fig. 20, for comparison purposes, but without regard to scale; Fig. 24 is a diagrammatic view illustrating the action of the cutter in shaping one side of a wedge-heel blank or block; Fig. 24a is a similar view illustrating the shaping of the other side of the block; Figs. 25 and 26 are plans of different-shaped controlling cams for controlling the cutting of differently shaped wedge-heel blanks; Fig. 27 is a perspective of a wedge-heel blank or block adapted to be operated upon by the machine of the present invention; Fig. 28 is a similar perspective of the same blank, as it appears after the wedge-heel blank shown in Fig. 27 has been operated upon by the machine of the present invention; Fig. 29 is a perspective of a detail; and Fig. 30 is a section taken upon the line 30—30 of Fig. 19, looking in the direction of the arrows, but upon a smaller scale.

As shown at the left of Fig. 2 and in Figs. 11, 12, 24 and 27, the wedge-shaped heel blank or block 3 is originally, prior to operation thereon by the machine of the present invention, provided with side faces 313, a lower tread face 5 and an upper heel-attaching-portion face comprising a heel portion 7 and a shank portion 9. At one side, the shank portion 9 merges with the heel portion 7 at an intermediate or arch portion 11. At its other side, the shank portion 9 meets the tread face 5 at the thin front or breast-end edge 39 of the wedge to form corners 341 and 343.

After operation by the machine of the present invention, the heel blank 3 becomes converted into the blank shown at 1 in Figs. 24a and 28, and at the right of Fig. 2. The blank 1 is shown provided with two turned side-face portions 13 and a back 15 at the thick or rear end of the wedge. The faces 13 are separated from the heel portion 7 by sharp lines 17 and 19, from the shank portion 9 by sharp lines 21 and 23, and from the intermediate portion 11 by sharp lines 25 and 27. The upper heel-attaching-portion face 9, 11, 7 becomes thus separated from the side faces 13 and the back 15 of the heel by a continuous sharp contour 21, 25, 17, 19, 27, 23. The sharp line 21 is shown meeting the thin edge 39 of the wedge at a corner 41, and the sharp line 23 the thin edge 39 at a corner 43, at the front or breast of the heel. The lines 21 and 23 are nearer together than the lines 17 and 19 or the corners 41 and 43, providing hollows 104 in the sides 13. The side portions 13, with the hollows 104, and the back 15 constitute a substantially right-cylindrical surface having a cross section corresponding to the heel-and-shank portion of a shoe.

The upper heel-attaching-portion face 9, 11, 7 is left undisturbed by the machine of the present invention. It may be suitably shaped either prior or subsequent to the operation, by the machine of the present invention, upon the sides 313 and the back of the heel blank 3. Subsequent operation is preferred, according to the method described in Letters Patent 2,245,904, issued June 17, 1941, to George R. Constantine. For purpose of the present specification, therefore, the heel blank 1 may be spoken of as the completed or finished heel blank, in contradistinction to the original or untreated heel blank 3. It will be understood, however, that the machine of the present invention is adapted to operate, not only upon heel blanks that have already been previously fashioned into untreated heel blanks 3, but also upon rough-sawed heel blanks or heel blanks of any other type. Certain features of the invention, indeed, as before stated, may be embodied in machines for making other articles than heels.

The sides 313 and the back of the untreated heel blank 3 may be shaped with the aid of a rotatable turning cutter 198, Figs. 2, 11 and 12, comprising turning-cutter blades or edges mounted upon a cutter-shaft spindle 196 to rotate rapidly along a more or less conical or other surface of revolution, roughly indicated in cross section by the circle 24 in Figs. 8, 24 and 24a. The turning-cutter blades or edges are therefore revolvable about the axis of the shaft spindle 196. As the untreated heel blank 3 is actuated from the position A toward and beyond the position B into the position C of Fig. 24, its corner 341 at its thin front or breast-end edge 39 is first presented to the cutter 198. The cutter 198 is thus caused to commence the turning of the untreated heel blank 3 by reason of its revolvable cutter blades or edges first cutting into the side face 313 adjacent to the corner 341, as shown at the position C. More and more of this side face 313 becomes cut away as the untreated heel blank 3 is swung further into the cutter 198 in the successively assumed positions D and E until, by the time that the heel blank has assumed the half-way position F, the rotatable turning cutter 198 has completed the turning of one-half of the blank 3; thus providing one of the faces 13, from the corner 41 to the back 15. As the half-finished heel blank becomes further actuated successively through the positions G, H and I, as shown in Fig. 24a, the cutter 198 continues to turn cut it, from the back 15, along its other side face 313, until, in the position J, shown more clearly in the position K, it has completed the turning cutting of the now finished heel blank 1, from the back 15 to the other corner 43.

As appears from the diagrammatic showing of Figs. 24 and 24a, this turning cutting of the untreated heel blank 3 from the corner 341, along one of its sides 313, to the back, and then along its other side 313 to the corner 343, is effected in a single continuous operation as the heel blank 3 approaches toward and moves past and away from the cutter 198. The movement toward the cutter may be defined as the movement just prior to the time when the cutting operation commences. The movement past the cutter may be defined as the movement during the complete cutting of the heel blank. The movement away from the cutter may be defined as the movement after the completion of the cutting operation. This terminology, explained more fully hereinafter, will be employed in the claims.

As the heel blank 3 approaches the cutter 198, the left-hand portion of the surface of revolution 24 of the cutter 198, as shown in Figs. 24 and 24a, effects the cutting in the positions of the heel blank represented at C, D and E. Successively disposed further portions of the surface of revolution 24 of the cutter 198 effect the cutting of the heel blank in the positions F, G, H and I. The machine described herein will perform this continuous operation, and perform it properly, irrespective of the shape, the size or other characteristics of the finished heel blank 1 that it is desired to produce. It has not usually heretofore been practicable to turn wood heels by a continuous operation, because of the danger of splintering, but splintering will only rarely occur with the machine of the present invention, if the grain of the wood of the untreated wedge-heel block 3 is disposed longitudinally.

During the presentation of the untreated heel blank 3 to the rotatable turning cutter 198, it is held clamped between the lower jaw 58 and the upper jaw 122 of a clamping jack, shown more particularly in Figs. 2, 4, 5, 9, 11, and 29. The lower jaw 58 is shown provided with an upper clamping face for engaging the lower tread face 5 and the upper jaw 122 with a lower clamping face for engaging the arch portion 11 of the upper heel-attaching-portion face of the heel blank 3. Four such clamping jacks are illustrated, each successively disposed at four stations, shown in Figs. 1, 2, 8, 19 and 20 at L, M, N and O. The clamping jacks are equally spaced, at ninety-degree intervals, along the circumference of a horizontally disposed circular planar work-table support 2. At the stations L, M and O, the jacks are shown occupying positions indicated at W, Q and U, respectively, by full lines in Figs. 1 and 2 and dot-and-dash lines in Fig. 8. At the station N, the jack is shown occupying a position S, shown by full lines in Figs. 1 and 2 and by dot-and-dash lines in Fig. 8. The table 2 is continuously rotated in its horizontal plane about a central vertically disposed axis. According to the illustrated embodiment of the invention, the direction of rotation is clock-wise, as indicated by the arrow 45.

The table 2 is shown in Fig. 2 provided with a central vertically disposed depending shaft 63 mounted in a correspondingly vertically positioned tubular supporting structure 65 provided in a base support 4, mounted on a base 10. The table shaft 63 and the tubular structure 65 in which it is mounted are coaxial with the vertically disposed axis of rotation of the table 2. Upper bearings 67 and lower bearing 69 for the shaft 63 are interposed between the shaft 63 and its supporting structure 65. The upper bearing 67 is funnel-shaped, to conform to the shapes of the upper portions of the table shaft 63 and the tubular structure 65 between which it is disposed. The lower bearing 69, shown cylindrical, rests on a detachable base 71 that supports the lower portion of the table shaft 63, in order not to impose the full weight of the table 2 upon the upper funnel-shaped bearing 67.

The table 2 is continuously rotated about its axis by means of a worm 29, shown clearly in Fig. 3, that meshes with a gear 28 provided on a circumferentially disposed depending skirt 73 of the table 2, shown more particularly in Figs. 2, 4 and 5, just above the upper bearing 67. The worm 29 is mounted on a sleeve 59 about a drive shaft 194 that is provided with a pulley 195 driven by a belt 33 from a motor-driven pulley 31. One end of the shaft 194 is provided with a bearing 79 in a bearing support 106. The other end of the shaft 194 is provided with a bearing 193, held against an end of a spacer sleeve 191 by a nut 199 in a bearing support 179. Access to the support for the pulley 31, for repair or other purposes, may be had through the machine frame 214, as shown in Fig. 3, by manipulating a knob 229, shown in Fig. 1, of a door 231, hinged at 235.

In order to permit tensioning the belt 33, a motor 30 for driving the pulley 31, as shown in Figs. 2 and 3, is mounted on a slide base 32 that is horizontally slidable, for adjustment purposes, in a groove 35 of a fixed part 37 of the machine. The slidable adjustment of the motor 30 may be effected by means of a screw 34 that is threaded in the slide base 32 and in an upstanding lug 75 of the stationary part 37 of the machine. The screw 34 may be turned by a hand wheel 36 at one of its ends, and the degree of slidable adjustment of the slide base 32 may be limited by a collar 38 integrally provided on the other end of the screw 34.

The untreated heel blank 3 may be loaded or supplied, manually or automatically, between the jaws 58 and 122 of that clamping jack that happens to be positioned at the station O. The station O may, therefore, be called the loading station. At the time of loading, at the station O, the jack occupies the position U of Figs. 1 and 8. This may be termed the radially disposed position of the jack. The upper jaw 122 of the clamping jack at the station O is at this time raised sufficiently above its lower jaw 58, to permit of interposing the untreated heel blank 3 between them, as is illustrated in Fig. 9. As shown more particularly in Fig. 29, the lower jaw 58 may be provided with a platform 102 on which the untreated heel blanks 3 may be positioned against a gage 59. For the sake of simplicity, the platform 102 and the gage 59 are omitted from the other figures. The untreated heel blank 3 is placed on the platform 102 with the breast-end edge 39 radially outward of the table 2, as shown in Fig. 29.

As the table 2 continues to rotate in the direction of the arrow 45, to carry or transport the jack, with the untreated heel blank 3 resting on the platform 102, from the station O toward the station L, the upper jaw 122 is actuated very forcibly downward, as will be more fully described hereinafter, in order securely to clamp the untreated heel blank 3 against the lower jaw 58. This takes place at a time when the jack occupies the full-line position V of Fig. 8. In this position V, too, the jack is still disposed radially. As the table 2 continues to rotate further in the direction of the arrow 45, carrying with it the jack and the untreated heel blank 3 clamped thereby, the jack begins to rotate out of its radially disposed position about a vertically disposed axis eccentric to the axis of rotation of the table 2 clockwise, in the direction of the arrow 55 of Fig. 8, from the said full-line position V of Fig. 8, through the dotted-line position W at the station L, toward the full-line position P. Shortly after the jack leaves the position W, at the station L, and before it reaches the position P, the untreated heel block 3 becomes rotated through an angle of 135 degrees in space, to assume the position A of Fig. 24. With respect to the table 2, of course, this angle of 135 degrees in space corresponds to a rotation of only 90 degrees.

Up to the time that the jack reaches the position P, it continues to rotate about its vertically disposed axis clockwise, as indicated by the arrow 61 of Fig. 8. This results in continued rotation of the jack about its vertically disposed axis, through a total angle of 180 degrees in space, as may be observed by comparing the relative positions occupied by the jack at the full-line positions V and P of Fig. 8. With respect to the table 2, however, the complete rotation of the jack has been through an angle of only 90 degrees. The untreated heel blank 3 now occupies the position B of Fig. 24. Through the breast-end edge 39 of the untreated heel blank 3 was positioned radially outward of the rotatable table 3 when the jack occupied the full-line position V of Fig. 8, as shown in Fig. 29, it will now be disposed, in the position B, at an angle such that the corner 341 of the untreated heel blank 3 will be very much closer to the surface of revolution of the turning cutter 198, represented by the circle 24, than any other portion of the heel blank 3. The very purpose of rotating the jack about its vertical axis clockwise, in the direction of the arrows 55 and 61 of Fig. 8, indeed, was to effect this repositioning of the untreated heel blank 3 with respect to the turning cutter 198.

With further continued rotation of the table 2, the jack will be carried along the circular arc 244 of Fig. 24 toward the cutter 198, the surface of revolution of which is represented by the circle 24. After leaving the full-line position P of Fig. 8, however, the jack is suddenly caused to reverse its rotation about its vertical axis, from the clockwise direction indicated by the arrow 61 of Fig. 8, to the anti-clockwise direction indicated by the arrow 47. The untreated clamped heel blank 3 is therefore actuated from the position B toward the position C. As the untreated clamped heel blank 3 approaches the revolving cutter blades or edges of the cutter 198, its corner 341 is carried into those revolving blades or edges. It has already been stated that movement of the heel blank 3 toward the cutter just prior to the time when the cutting operation commences will be referred to in the claims as movement toward the cutter.

As the jack continues to travel along the circular arc 244, it becomes further rotated in the direction of the arrow 47, thus causing the untreated heel blank 3 to assume the further positions D to F in Fig. 24. The position F is assumed by the heel blank when the jack occupies the position Q, at the station M. In this position F, as before explained, one side face 313 of the untreated heel blank 3 has become completely turned, to produce half of the finished blank 1, from the corner 41 to the back 15.

During the further continued rotation of the table 2 about its vertical axis, in the direction of the arrow 45, the jack continues to rotate about its own vertical axis, in the same counter-clockwise direction, as indicated by the arrow 49 of Fig. 8, from the station M toward the full-line position R of Fig. 8. During this further rotation of the jack, the heel blank 3 clamped thereby is actuated from the position F of Figs. 24 and 24a, successively through the positions G, H, I and J. As before explained, this completes the turning of the untreated heel blank 3, converting it into the finished shape indicated in Fig. 28 at 1. As this turning operation is effected entirely during the time that the jack passes from the full-line position P to the full-line position R, from one side of the station M to its opposite side, the station M may be termed the operating station. In the claims, as already stated, the movement of the heel blank during the complete cutting operation will be referred to as movement past the cutter. The movement thereafter will be referred to as movement away from the cutter.

In order to produce the finished shape 1, the points of clamping engagement of the heel blank 3 by the jaws 58 and 122 are caused to travel along a path 242 that is not parallel to the circular path 244 of travel of the jack. The points of clamping engagement, in the various positions A to K, are respectively indicated by the respective reference characters A' to K'. As will hereinafter more fully appear, this result is attained by clamping the heel blank on the jack eccentrically to the axis of rotation of the jack.

The completion of the operation of turning the heel blank 3, in the position R, does not terminate the operation of the machine. With further continued rotation of the table 2 about its vertical axis, in the direction of the arrow 45, the jack, upon leaving the full-line position R, again suddenly reverses the direction of its rotation about its vertically disposed axis. As indicated by the arrow 51 of Fig. 8, the jack thereafter rotates clockwise. The very firm clamping action of the upper jaw 122 upon the finished heel blank 1, moreover, as will hereinafter appear, becomes, at this time, greatly lessened, though it is still effective to hold the completed heel blank 1 lightly in place. Shortly after the jack leaves the full-line position R, and prior to reaching the dot-and-dash-line position S, the finished heel blank 1 assumes the position K of Fig. 24a. The jack continues to rotate about its vertically disposed axis clockwise, as indicated by the arrow 53, until it is carried by the rotating table 2 from the full-line position R toward and past the dashed-line position S, at the station N.

After leaving the station N, the jack reassumes the radial position that it lost after leaving the position V. This radial position it continues to retain in the position U, at the station O, and until after it again passes beyond the station V. Thereafter, the jack recommences its above-described cycle of first rotating about its vertically disposed axis clockwise, in the direction of the arrows 55 and 61, then counter-clockwise, in the direction of the arrows 47 and 49, and finally clockwise again, in the direction of the arrows 51 and 53.

Though the machine is shown provided with four stations L, M, N and O, therefore, only one untreated heel blank 3 is at any one time operated upon, and at the station M only. Each jack, as it reaches the loading station O, becomes loaded with an untreated blank 3, which is then turned at the operating station M. Since the machine is shown provided with four jacks, four untreated blocks 3 will become thus finished corresponding to each complete rotation of the table 2 in the direction of the arrow 45. The speed of the machine is regulated to perform this work as rapidly as the operator can load the machine.

The construction of the jacks and their rotating mechanism will now be described. As the jacks are all alike it will suffice to describe only one of them.

The lower jaw 58 of each jack is mounted upon a clamp-jaw support 60 carried by the lower arm of a U-shaped jack support 118, as illustrated clearly in Figs. 2, 4, 5, 9 and 11. The upper jaw 122 is carried by the upper arm of the jack support 118. As the lower arm of the jack support 118 is keyed at 65 to a vertically disposed jack shaft 62, the jack, with its jaws 58 and 122, in effect, is mounted on the shaft 62. The axis of the jack shaft 62 coincides with the vertically disposed axis of rotation of the jack, but is eccentric to the axis of rotation of the table 2. The shaft 62 is provided with a lower portion 81 of enlarged diameter that extends downward into a vertically disposed opening 83 in the skirt 73 of the table 2 and is supported for rotation about its vertically disposed axis by an upper bearing 68 and a lower bearing 85.

It has before been explained that the path of travel 242, Figs. 24 and 24a, of the clamping points A' to K' of Figs. 24 and 24a is not parallel to the circular path 244 of travel of the jack. This is because the jaws 58 and 122 are eccentrically disposed to one side of the axis of the shaft 62.

The upper bearing 68 is adjustably held in position on the enlarged portion 81 of the shaft 62 between a lower bearing retainer 70 and an upper nut 87 in a collared base 66 that, as clearly shown in Fig. 4, is screwed to the upper surface of the rotary table 2. The bearing retainer 70 is held in an upper countersunk portion of the opening 83 against the lower face of the collar of the collared base 66 by bolts 89 that also hold a cap 64 on the collared base 66. The cap 64 houses the nut 87 and a portion of the shaft 62 above its enlarged-diameter portion 81.

The lower bearing 85 of the portion 81 of larger diameter of the shaft 62 rotates in a bearing support 74, that, as shown in Figs. 2 and 4, is screwed to the lower face of the depending skirt 73 of the rotary table 2. The bearing support 74, in turn, is disposed between oppositely projecting countersunk arms 76 disposed at the upper end of an exteriorly threaded sleeve 54, as clearly shown in Figs. 2, 4, 5 and 6. The sleeve 54 is fixed to the lower face of the rotary table 2 by screws 95 extending through its oppositely projecting arms 76 into the under surface of the rotary-table skirt 73. With the parts contained therein, therefore, the sleeve 54 is rotated, with the table 2, below the table as a unit with the jack mounted above the table. One of these contained parts, shown in Figs. 4 and 6, extending below the bearing 85 into the upper portion of the sleeve 54, comprises a double-pitched screw 84 provided at the lower terminal end of the enlarged portion 81 of the jack shaft 62. Another of these parts comprises an elongated double-pitched nut 86 that meshes with the double-pitched screw 84. It is by means of the cooperating double-pitched screw threads of the screw 84 and the nut 86, as will hereinafter appear, that the jack is rotated, as before described, about its vertically disposed axis.

The nut 86 is fixed to the inner surface of a sleeve 88 that is prevented from rotating in the sleeve 54, as clearly shown in Figs. 4, 6 and 7, by oppositely disposed keys 90 in a keyway 77 of the sleeve 54. Though thus prevented from rotating in the sleeve 54, the double-pitched nut 86, with the sleeve 88, is nevertheless free to slide up and down therein, as is clear from a comparison of Figs. 4 and 5. This upward and downward slidable movement of the nut 86, of course, will effect rotation of the double-pitched screw 84 with which it meshes, thus resulting in rotation of the shaft 62 and the jack carried thereby.

Below the double-pitched nut 86, the sleeve 88 is provided with a collar 90; and, below the collar 90, with interiorly disposed screw threads into which is threaded a threaded shank or sleeve 93 of a spring-and-carrier bearing 96, held in position by a lock nut 94. Disposed in the sleeve 93 is an upwardly extending stem of a cam follower 92 in the lower end of which is fixed a transversely disposed stem 100 about which a cam-follower roller 98 is rotatably mounted.

As the table 2 rotates about its vertically disposed axis, the cam-follower roller 98 rolls along successive portions of the upper track of a horizontally disposed jack cam 40. As will be understood from Figs. 2, 4, 5, 8, 19 and 30, the jack cam 40 is concentric with the table 2, and different portions of the upper track of the jack cam 40 are disposed at different levels. As the table 2 rotates, thereafter, and the cam-follower roller 98 travels along the jack cams 40, it is therefore caused to rise and fall. This rising and falling of the cam-follower roller 98 effects the raising and the lowering of the sleeve 88 in the sleeve 54 and, consequently, through the intermeshing engagement of the double-pitched screw 84 and the double-pitched nut 86, the rotation of the jack about its vertically disposed axis. The roller 98 is prevented from becoming disengaged from the upper track of the jack cam 40 by a depending guide 97 that engages constantly against the outer side surface of the cam 40. The guide 97 is carried at the lower end of an arm 99 that is fixed to the cam follower 92, as shown more particularly in Figs. 2 and 4.

In Fig. 4, the cam-follower roller 98 is shown engaging the lowest portion 42 of the cam 40. The construction of this lowest portion will be made clearer by reference to Figs. 19 and 30.

The jack, at this time, occupies the position P of Fig. 8. As already explained, the jack, at this time, has been rotated about its vertically disposed axis to the maximum angular extent clockwise, in the direction of the arrow 61 of Fig. 8, and is about to reverse its direction of rotation in the direction of the arrow 47. It is because the cam-follower-roller 98 occupies this lowest portion 42 of the cam 40 that the jack has been thus rotated to its maximum extent.

As the table 2 continues to rotate about its vertically disposed axis in the direction of the arrow 45, the cam-follower roller 98 starts to rise along an abruptly rising portion 44 of the cam 40. This causes the double-pitched nut 86 to become elevated in the sleeve 54. Since the double-pitched nut 86 is prevented by the keys 80 and the keyways 77 from rotating in the sleeve 54, the double-pitched screw 84 is forced to rotate, thus effecting the rotation of the shaft 62. It is for this reason that the jack, as before described, during its travel from the position P of Fig. 8, toward the position R, rotates about its vertically disposed axis anti-clockwise, in the direction of the arrow 47. By the time that the cam-follower roller 98 has traveled half-way up the abruptly-rising portion 44 of the cam 40, the jack will have assumed the position Q of Figs. 1 and 8, at the station M. By this time, as before explained, the untreated heel blank 3 will have been carried through the positions A, B, C, D and E, to the position F of Fig. 24.

As the table 2 continues to rotate in the direction of the arrow 45, carrying the jack beyond the station M, toward the station N, the cam-follower roller 98 continues to rise on the abruptly-rising portion 44 of the cam 40, thus causing the jack to rotate still further in the same direction, toward the position R of Fig. 8. During this continued rotation, the jack, however, travels gradually away from the cutter 198, instead of towards it, thus effecting the reverse operation to that just described, causing the heel blank to be carried through the successive positions F, G, H, I and J of Fig. 24a, and completing the turning of the heel blank. The positions F to K of Fig. 24a correspond to the further rotation of the jack, until it reaches the position R. In this position the cam-follower roller 98 occupies the highest point 46 of the cam 40. The cam portion 44 is so designed, therefore, from its lowest portion 42, in the position P of the jack, to the highest portion 46, in the position R, that the rotation of the jack about its vertically disposed axis is controlled in timed relation to the rotation of the table 2 to actuate the jack to and beyond the operating station M.

It is because, as before described, the jaws 58 and 122 clamp the heel blank eccentrically with respect to the vertically disposed axis of the jack that, as the jack rotates about this vertically disposed axis, with continued rotation of the table 2 in the direction of the arrow 45, the untreated heel blank 3 clamped thereby is first driven, from its corner 341, at the front or breast edge 39, deeper and deeper into the revolving turning cutter 198, along one side 313, as shown in the positions C to F, until the back of the heel is reached, and then less and less deep, along the other side 313 of the heel blank 3, as shown by the positions F to I, back to the corner 343, at the front of the heel blank.

As a further consequence of the fact that the jaws 122 and 58 clamp the heel blank 3 in a region that is disposed eccentrically with respect to the vertically disposed axis of rotation of the shaft 62 of the jack, moreover, the speed of rotation of the heel blank 3 about the cutter 198 will be slowest at the time that the back of the heel blank travels into the cutter 198, when the jack occupies the position Q of Figs. 1 and 8, at the station M. As appears more particularly from Fig. 11, the region of clamping action of the jaws 122 and 58 is at this time at its maximum distance from the cutter 198. Because of this lowered speed, the strain produced on the blank 3 by the cutter 198 is least at this time, which is desirable because the thickest portion of the untreated heel blank 3, at the heel, is at this time being operated upon. The speed of rotation of the heel blank 3, for the same reason, is greatest when the corners 341 and 343, at the front of the heel blank, are operated upon.

The operation has now been described corresponding to the travel of the cam-follower roller 98 from the lowest point 42 of the cam 40, in the position P of the jack, past the position Q at the station M, to the highest point 46 of the cam 40, in the position R. With further continued rotation of the table 2 in the direction of arrow 45, the cam-follower roller 98 starts to descend on a drop portion 48 of the cam 40. The sleeve 54 will therefore start to descend, with the result that the double-pitch nut 86 will cause the double-pitch screw 84 to turn in the opposite direction, or clockwise, as indicated by the arrow 51 of Fig. 8. This will explain the description above of the sudden reversal of rotation of the jack in the position R. A spring 82, coiled about the sleeve 54 between the bearing 96 and lock nuts 78 threaded on the exterior of the sleeve 54, which has been placed under tension during the upward travel of the cam-follower roller 98 on the abruptly rising portion 44 of the cam 40, will unwind quickly to aid gravity to carry the cam-follower roller 98 down rapidly along the drop portion 48 of the cam 40. This will ensure turning of the jack shaft 62 about its vertically disposed axis clockwise, in the direction of the arrow 51. A spring 72 coiled about the enlarged portion 81 of the jack shaft 62, and fixed at one end 101 to the shaft 81 and at the other end 103 to the bearing retainer 70, has also been placed under tension during the upward travel of the cam-follower roller 98 on the cam 40. The spring 72 will also unwind quickly, thus further helping to turn the shaft 62 clockwise, in the direction of the arrow 51.

After the drop portion 48 of the cam 40 has been passed by the cam-follower roller 98, the jack, at the station N, assumes the position S, shown by dot-and-dash lines in Fig. 8, and by full lines in Figs. 1 and 2. Thereafter, the cam-follower roller 98 engages a portion 50 of the cam 40 that is substantially horizontal. During the further continuous rotation of the table 2, therefore, there will be no further rotation of the jack, after it travels past the station N, through the position T and the position U at the station O, until it returns to the position V.

Prior to the jack reaching the position V, it will again become loaded by the operator, at the station O, with another untreated heel blank 3. The table 2 continues to rotate past the position V toward the position W, at the station L. Just before reaching the station L, at a point 139 of the cam 40, the cam-follower roller 98 rides rapidly down a drop portion 52 of the cam 40, to return once more to the before-described lowest cam point 42.

The cam 40, the cam follower 92 with its camfollower roller 98, and the sleeves 54, together with the parts adjacent thereto, are shown in Fig. 2 contained in an oil bath 56 between the tubular supporting structure 65 of the base 4 and a coaxially disposed cylindrical outer casing 6. The casing 6 is provided with a window, not shown, through which access may be had to the interior. The window may be closed by a removable side wall 8.

It is now in order to describe the mechanism for clamping the upper jaw 122 against the untreated heel blank 3 on the lower jaw 58.

As shown more particularly in Fig. 9, the upper clamping jaw 122 is carried at the lower end of a ram 120 that, in turn, is disposed at the lower end of a plunger rod 200. The plunger rod 200, with its ram 120, may be forced downward by pneumatic pressure through a plunger-ram support 124 carried at the upper end of the U-shaped jack support 118. The pneumatic pressure is caused to act upon a piston-plunger 105 in a chamber or housing of an air unit 22. The chamber or housing is contained between upper and lower castings 116 and 117. Air is admitted to the air chamber at the upper side of the piston plunger 105, to force the ram 120 downward, through an upper air pipe 134 one end which communicates with the said upper side of the piston through fittings 136 and 138. Air is admitted to the air chamber at the lower side of the piston plunger 105 through a lower air pipe 140, one end of which communicates with the said lower side of the piston through similar fittings 136 and 138. The other ends of the air pipes 134 and 140, as shown more particularly in Fig. 22, are each connected, through a nut 132 and a fixed block 130, to a common pivot block 126.

Figure 22:
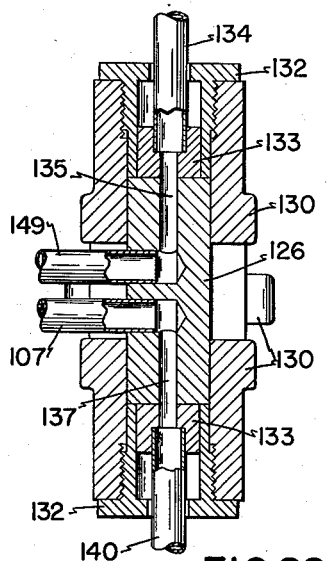

Through the pivot block 126, as shown in Fig. 22, the air tube 134 is connected, by a bearing-block fitting 133 and a passage 135 in the pivot block 126, to an air tube 149; and the air tube 140 similarly by a bearing-block fitting 133 and a passage 137 in the pivot block 126, to an air tube 107. The air tubes 149 and 102 are bound in a split pipe 171 or 173 that, as shown in Figs. 1 and 9, communicates with the upper end 109 of a guard 159 that extends downward to merge into a housing cover 157. The lower portions of the air tubes 107 and 149, shown extending through the housing cover 157, and under a strap 158, are designated at 156 and 155, respectively, Figs. 9, 20 and 21.

As is more particularly illustrated in Figs. 9 and 21, the air tubes 155 and 156 respectively communicate with clamping-jack ducts 111 and 113 in a block 152, disposed centrally below the rotary table 2, under a cover plate 150 that is fixed to the table 2, so as to rotate therewith. The block 152 is fixed to the underside of the cover plate 150 by a circularly arranged group of tie-rod bolts 125, as is clearly shown in Figs. 9, 20, 21 and 23. The block 152 therefore rotates as a unit with the table 2. The upper end of a stationary column 154 extends centrally through the block 152, vertically along the axis of rotation of the table 2, as shown in Fig. 2. An air-intake tube 146 integrally surmounting the column 154, extends through glands 129 in the block 152 and the cover plate 150. The glands 129 may be reached by unfastening fittings 148 and 153. The air-intake shaft 146 is provided with a longitudinally extending duct 147, the upper end of which is connected to an air-feed intake 142 that is connected by a fitting 144 to an air-tube hose 115. The element 63 constitutes a bearing, rotating about the column 154 as a stationary shaft to effect the rotation of the table 2. The lower end of the column shaft 154 is supported by a shaft retainer 71, as shown in Fig. 2.

Figure 20:
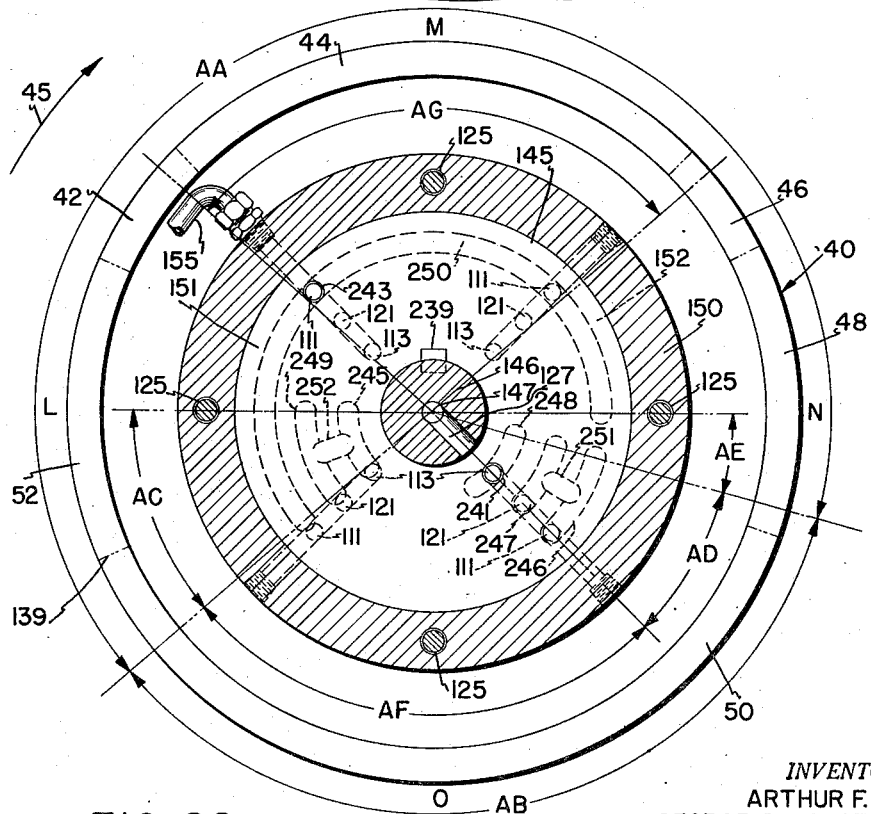
Figure 21:
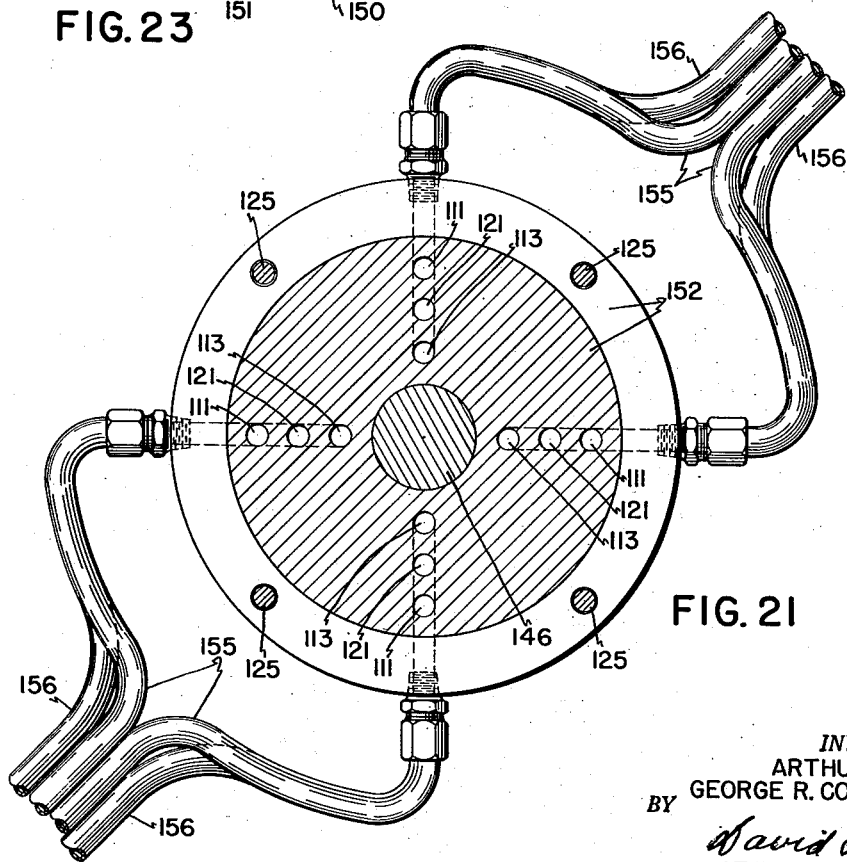

At its lower end, the duct 147 terminates in a right-angular extension 127 that, as shown in Figs. 9 and 20, communicates with an air space 145. The air space 145 is provided in a centrally disposed circular depending flange 253 of the cover plate 150, between the lower surface of this cover plate and the upper surface of a circular plate 151 that fits in the circular depending flange 253, inside the circularly arranged group of bolts 125. The under surface of the circular plate 151 contacts at 131 with the upper cylindrically extending portion of the block 152 which, as is clear from Fig. 9, also projects into the circular depending flange 253, the parts being held assembled by the tie-rod bolts 125. The circular plate 151 is fixed in this assembly to the stationary air-intake tube 146 of the column 154 by a key 239, as shown in Figs. 9, 20 and 23.

Figure 23:
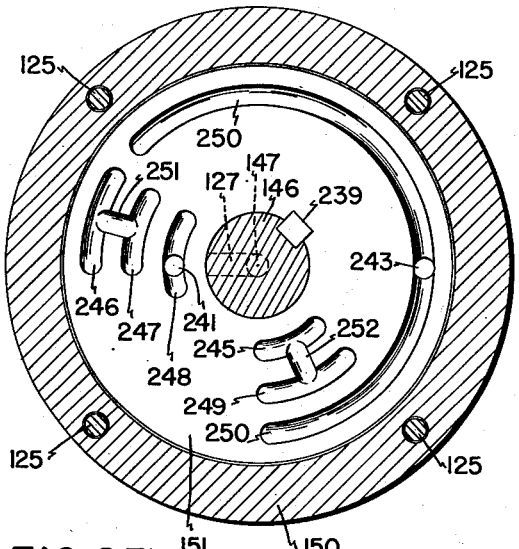

The under surface of the circular plate 151, as shown in Figs. 9, 20 and 23, is provided with a plurality of circular-arc openings concentric with the axis of rotation of the table 2. The arcuate openings 246 and 250 are disposed along a common circumference at the greatest distance from the center of the circular plate 151 and from the axis of rotation of the table 2. The arcuate opening 250 communicates, through a duct 243, with the air space 145 at the upper surface of the circular plate 151, but this is not true of the arcuate opening 246. The arcuate opening 250 extends through an angle considerably greater than 180 degrees, but the arcuate opening 246 is very much shorter.

Along a common circumference disposed nearer to the center of the circular plate 151 than the arcuate openings 246 and 250 are two short arcuate openings 247 and 249; and along a common circumference nearer still are two short arcuate openings 245 and 248. The short arcuate opening 248, like the arcuate opening 250, communicates, through a duct 241, with the air space 145 at the upper surface of the circular plate 151, but this is not true of the arcuate openings 245, 247 and 249. The arcuate openings 246 and 247, however, are connected by a passage 251, and the arcuate openings 245 and 249 by a passage 252. The arcuate openings 245 and 249 are radially alined with one end of the long arcuate opening 250. The arcuate openings 246, 247 and 248 are radially alined beyond the other end of the long arcuate opening 250.

In Figs. 9 and 23, the duct 241 is shown as of the same diameter as the width of the arcuate opening 248, and the duct 243 as of the same diameter as the width of the arcuate opening 250.

The arcuate openings are disposed so that, during the rotation of the table 2, the clamping-jack ducts 111 will become successively alined with the arcuate openings 246 and 250, and the clamping-jack ducts 113 with the arcuate openings 245 and 248. During the rotation of the table 2, moreover, exhaust ducts 121, also provided in the block 152, will become alined with the arcuate openings 247 and 249.

In Fig. 9, the left-hand clamping-jack duct 111 is shown aligned with the arcuate opening 246, and the corresponding exhaust duct 121 with the arcuate opening 247. The same relative positions are shown also in Fig. 20. The portion 155 of the air tube 149, therefore, in this position, connects the upper side of the piston 105 to the exhaust duct 121 through the arcuate opening 246, the passage 251 and the arcuate opening 247. In this same Fig. 9, the left-hand clamping-jack duct 113 is shown alined with the arcuate opening 248. The portion 156 of the air tube 107, therefore, connects the lower side of the piston 105, through the duct 113, by way of the arcuate opening 248 and the duct 241, to the air space 145 and, by way of the duct 127, 147 of the air-intake tube 146, to the source of fluid pressure. With the parts occupying these relative positions, therefore, the piston 105 will raise the ram 120 to release the clamping pressure of the clamping jaw 122 of the left-hand jack upon the finished heel blank. The finished heel blank 1 will therefore fall out from between the clamping jaws 58 and 122. Since, at this time, the jack occupies the full-line position T of Fig. 8, the finished heel blank 1 will become deposited in a receptacle 57 provided for that purpose a little to the right of the station O, as viewed in Figs. 1 and 8.

With the parts occupying the same relative positions, illustrated in Figs. 9 and 20, however, the clamping jack, not shown, disposed diametrically opposite to the left-hand clamping jack of Fig. 9 will occupy the position P of Fig. 8. The upper jaw 122 of this oppositely-disposed jack, at the position P, will clamp the untreated heel blank 3 firmly in place, because the upper side of the piston 105 will be subjected to air pressure by way of the air duct 147, 127, the air space 145, the duct 243, the arcuate opening 250, the right-hand duct 111 of Fig. 9, to the portion 155 of the air tube 149. The lower side of the piston 105, at the same time, will be open to the right-hand exhaust duct 121 of Fig. 9 by way of the arcuate opening 249, the passage 252, the arcuate opening 245, the right-hand duct 113 of Fig. 9, and the portion 156 of the air tube 107. As will hereinafter appear, this opening of the exhaust channels and the clamping of the jack at the position P occurs during the travel of the jack through the angle AC, Fig. 20.

At predetermined points in the rotation of the table 2, therefore, the ducts 111 and 113 of the jacks become successively connected, first with the source of air pressure, and then with the atmosphere. This causes the ram 120, that carries the jack-clamping jaw 122, first to descend, in response to pneumatic pressure, into clamping engagement with an untreated heel blank 3, and then to ascend, in order to unclamp the finished heel blank 1. What these predetermined points are will be understood from a comparison of Fig. 20, into which the cam 40 has been incorporated, upon a smaller scale, with Figs. 8 and 19. As before explained, the untreated heel blanks 3 are loaded at the loading station O, at a time when the jack at this station occupies the position U, shown by full lines in Fig. 1 and by dot-and-dash lines in Fig. 8. At this time, as appears from Fig. 20, the clamping-jack ducts 111 and 113 are not connected to either the source of air supply or the exhaust, but merely contact the underside of the circular plate 151. The upper clamping jaw 122 having previously been raised at the time when the jack occupied the full-line position T of Fig. 8, and while the jack was traveling through the arc AD, Fig. 20, as will be explained more fully hereinafter, it remains raised. In the position U at the station O, moreover, the jack occupies its before-described position radial with respect to the rotary table 2, as the cam-follower roller 98, at this time, engages the substantially horizontal portion 50 of the cam 40.

With continued rotation of the table 2 in the direction of the arrow 45, the cam-follower roller 98 reaches the portion 139 of the cam 40, immediately after which it descends along the drop portion 52 of the cam 40, Figs. 19 and 30, toward its lowest portion 42. Just prior to the descent, however, the upper jaw 122 of the jack is brought down to clamp the untreated heel blank 3 against the lower jaw 58. This is effected because, as shown in Fig. 20, the clamping-jack ducts 111 and 113 have become alined with the beginning portions of the arcuate openings 250 and 245, respectively, and the exhaust duct 121 has become alined with the corresponding portion of the arcuate opening 249 on the under face of the circular plate 151. Fluid under pressure, therefore, is admitted to the chamber above the piston 105, and the chamber below the piston 105 has become opened to the exhaust.

Fluid under pressure continues to be admitted to the chamber above the piston 105, and fluid continues to exhaust from the chamber below the piston 105, in order to effect firm clamping of the jaw 122 against the untreated heel blank 3, during the time that the jack travels from the position V toward the position W, at the station L, through an arc AC, substantially equal to the arcuate extent of the arcuate openings 245 and 249. Thereafter, during the further travel of the jack, toward the position Q, at the station M, the fluid will be maintained under pressure against the upper side of the piston 105 so long as the duct 111 is maintained in communication with the arcuate opening 250. As before explained, this arcuate opening extends through an angle greater than 180 degrees. This angle is the same as that between the positions V and S, the latter at the station N of Fig. 8. The untreated heel blank 3, therefore, will remain clamped on this jack throughout the time that the jack first rotates clockwise, in the direction of the arrows 55 and 61, as the cam-follower roller 98 rides down the portion 52 of the cam 40 to its lowest portion 42, then rotates counterclockwise, in the direction of the arrow 47 of Fig. 8, as the cam-follower roller 98 rides up the cam portion 44 to the portion 46, to finish the heel blank into the shape 1 of Fig. 28, and then rotates in the clockwise direction again, indicated by the arrow 51, as the cam-follower roller 98 rides down the portion 48 of the cam 40, and the jack assumes the position S at the station N.

On reaching the station N, the jack becomes disconnected from its source of fluid pressure because, as shown in Fig. 20, the arcuate opening 250 terminates at this station. The chamber of the air housing at the lower side of the piston 105 is not, however, yet connected to the exhaust. It will not become connected to the exhaust until the jack is carried by the rotary table 2 through a further arc, indicated at AE in Figs. 8, 19 and 20. The finished heel blank 1, therefore, will still be clamped on the jack, though with lighter pressure than was the case so long as the upper side of the piston 105 was maintained in communication with the source of air pressure. Throughout the large arc AA, from the time that the jack assumed the position V of Fig. 8 until the lower side of the piston 150 became open to the exhaust, therefore, the heel blank has been held clamped; first, very tightly, including the time during which the untreated heel blank 3 was operated upon by the turning cutter 198, over the arc represented at AG, and then lightly, after the completion of the finished heel blank 1, along the arc AE.

It has before been explained that the finished heel blank 1 is sometimes defective. If the operator who is loading the untreated blank 3 at the station O should observe this to be the case, he may prevent its becoming deflected into the receptacle 57, as before described, by striking it lightly with his hand. The clamping action of the jaws 58 and 122 upon the finished heel blank 1, during the travel of the jack through the arc AE is sufficiently light to permit the defective finished heel blank 1 becoming thrown to one side in response to a light blow of the hand. This light blow the operator may give without, in any way, interrupting the loading of the untreated heel blanks 3 at the station O.

If, however, the completed heel blank 1 is seen not to be defective, it is allowed to remain in place, held lightly between the jaws 58 and 122 of the jack until, with further continued rotation of the table 2 in the direction of the arrow 45, the upper clamp jaw 122 of this jack will be automatically caused to rise when the jack assumes the station T, whereupon, as before explained, the completed blank 3 will automatically fall into the receptacle 57. This rising of the upper jaw 122 commences when the jack assumes the position at the right-hand end of the arc AA because, as appears from Fig. 20, the jack ducts 111 and 113 become alined, in this position, with the arcuate openings 246 and 248 respectively, and the exhaust duct 121 becomes alined with the arcuate opening 247. This is the condition depicted by the left-hand jack shown in Fig. 9. The duct 113 becomes thus enabled to connect the chamber at the lower side of the piston 105 with the source of air pressure, and the upper side of the piston 105 becomes connected to the exhaust through the duct 121, the arcuate opening 247, the passage 251 and the arcuate opening 246. This unclamping action will continue throughout an angle AD corresponding to the angular extent of the arcuate openings 246 and 247. In the same manner that combined clamping and exhausting action takes place along the arc AC, so combined unclamping and exhausting action takes place along the arc AD. Upon the clamp becoming thus entirely ineffective, the finished heel blank 1 will drop into the receptacle 57.

The beginning terminations of the arcuate openings 246, 247 and 248 are shown in Figs. 20 and 23 along a common radius, but the end of the arcuate opening 248 is shown extending beyond the radius connecting the ends of the arcuate openings 246 and 247. The portion of the air chamber at the lower side of the piston 105, therefore, remains subjected to fluid pressure for a short time after the exhaust to the chamber at its upper side has been shut off. This will assure that the upper jaw 122 shall be raised throughout the further travel of the jack through the arc AF, until the jack returns to the position V. During the travel of the jack through the arc AF, the jaw 122 occupies its raised unclamping position, though the jack is not connected to the source of air pressure. This arc AF, therefore, corresponds to the arc AE, during which the jaw 122 is held in lightly-clamped position, though the jack is not connected to the source of air pressure. The total angle through which the jack remains unclamped, however, is represented at AB, which is 360 degrees minus the angle AA, through which the jack is held clamped. It is through the angle AG alone, however, between the positions P and R, that the cutter 198 turns the untreated heel blank 3 to finish it into the shape shown at 1.

The heel may, of course, be deeper or shallower, longer or shorter, or wider or narrower, than illustrated. Corresponding points of the lines 17 and 19, moreover, may be required to be substantially at the same level or at slightly different levels, assuming the tread face 5 to be horizontal, and the same may be true of the corresponding points of the lines 21 and 23. Points of the line 27, at the intermediate portion of the heel, are usually pronouncedly higher than the corresponding points of the line 25, to provide an inclined arch portion of the heel. The degree of this incline, though slight by absolute measurement, must be accurately determined, and it may vary from heel to heel. The machine of the present invention is designed to shape heel blocks 1 to suit all the above requirements, as they occur, in practice.

The shape imparted to the turned heel blank 1 will depend not only upon the arc on the rotating table 2 along which the rotating jack presents the untreated heel blank 3 to the cutter 198, but also upon the shape and the inclination of this cutter. By tiltingly adjusting the cutter 198, as from the full-line position of Fig. 11 or the dot-and-dash position of Fig. 12, to the full-line position of Fig. 12, different shapes may be obtained. An adjustment for effecting this tilting will now be described.

The cutter-shaft spindle 196 is mounted in a cutter-shaft housing 197 that, as shown in Figs. 1, 2, 11, 12 and 13, is carried by an arm 12. The arm 12, with the cutter-shaft housing 197 carried thereby, is angularly adjustable about a pivot stud 220 mounted on a tilt-permitting plate 202 of the frame of the machine, as may be understood from Figs. 13, 14 and 16. To effect the adjustment, it is necessary first to loosen bolts or studs 203, then to tilt the cutter-carrying arm 12 about the pivot stud 220, the bolts 203 meantime riding in arcuate openings 104 of the tilt-permitting plate 202, after which the bolts 203 may be retightened. The tilting adjustment of the cutter-carrying arm 12 may be effected by turning a tilt screw 204 in a tilt-screw guide 208 provided upon the arm 12, as is more clearly shown in Figs. 2, 13 and 16. The tilt screw 204 meshes with the threads of a tilt rack 206 provided upon the tilt-permitting plate 202.

This tilting adjustment of the cutter 198 with respect to the tilt-permitting plate 202, however, though it will provide different shapes of turned heel blanks 1, corresponding to the angular adjustment of the cutter-shape spindle 196, as is clear from Figs. 11 and 12, would yield only a single such heel shape corresponding to each tilting adjustment, if the arm 12 remained stationary in adjusted position. According to a further feature of the invention, however, it is possible to provide numerous shapes of turned heel blocks 1 corresponding to each tilting adjustment of the cutter-carrying arm 12.

According to the preferred embodiment of the invention that is herein illustrated and described, this result is attained by swinging the arm 12, with the cutter 198 carried thereby, back and forth, as desired, during the travel past the cutter 198 of the untreated heel blank 3. It is preferred to control the time and the degree of this swinging of the cutter by a cam 26, shown in Figs. 1, 2, 10, 13, 16 and 25. To obtain different shapes of turned heel blanks 1 corresponding to each tilting adjustment of the cutter-carrying arm 12, all that is necessary is to employ different cams 26. As shown in Fig. 26, therefore, this cam 26 may have different shapes, depending upon the shape of the finished heel blank 1 that is desired to produce.

In order to enable the cam 26 to effect this control, the cutter-carrying arm 12 and the tilt-permitting plate 202 on which it is tiltingly adjustable are swingably mounted about a pivot shaft 218, as shown in Figs. 1, 2, 13, 14, 16 and 17. The upper and lower ends of the shaft 218 are journaled in roller bearings 209 of bearing housings 211 set into pillow blocks 224, as clearly shown in Fig. 17. Lock washers 219, held against the roller bearings 209 by lock nuts 217, are concealed, together with the ends of the shaft 218 on which the lock washers 219 are screwed, by caps 222. The blocks 224 are carried by a pivot-shaft plate 228 that is held to the portion 214 of the frame of the machine by bolts 215 and studs 216. The bolts 215 are shown considerably longer than the studs 216, because they extend through the portion 214 of the machine frame.

Vertical adjustment of the cutter 198, to provide for still further variation in heel-blank shape, may be effected by vertically adjusting the pivot-shaft plate 228 between vertically disposed guide strips 226 bolted to the portion 214 of the frame of the machine, as illustrated more particularly in Figs. 1, 14 and 16. The guiding is aided by a vertically disposed rib or tongue 141 integrally provided on the pivot-shaft plate 228 and set into a corresponding groove of the portion 214 of the frame, as shown in Figs. 14 and 16. A fine degree of vertical adjustment may be provided by means of an adjusting screw 210 in an adjusting-screw bracket 212, positioned to one side of the before-described bracket 227, as shown in Figs. 1 and 13.

The cutter-shaft spindle 196 is provided with a pulley 18 driven by a belt 20 mounted over a pulley 16 driven by a motor 14. It is necessary to adjust the tension of the belt 20 to correspond to the various adjustments before described. The motor 14 is therefore mounted upon a plate 108, as shown more particularly in Figs. 1 and 18, that is pivoted about a pivot shaft 114 that is fixed in a plate 110 that is secured to the cutter-carrying arm 12. The degree of angular adjustment of the plate 108 about the pivot 114 may be controlled by an adjusting screw 112. As shown in Figs. 1, 13, 15 and 16, the unthreaded end of the screw 112 is pivotally connected to the plate 110 by means of a pivot screw 183 passing through a pivot hole 143 in the screw 112, and its threaded end passes through an opening 181 in the plate 108, being held in adjusted position by nuts.

The cutter-carrying arm 12 is yieldingly biased in one direction of swing about the pivot shaft 218 by a coil spring 221, clearly shown in Figs. 1 and 13. One end of the coil spring 221 is secured to an adjusting screw or stud 225 threaded in a stud bracket 227 at the top of the frame portion 214. The other end of the coil spring 221 is secured to an adjusting screw 223 held by nuts in the cutter-carrying arm 12. The cutter-carrying arm 12 may be swung, in opposition to the action of the spring 221, under the control of the cam 26, as will now be explained.

The before-described sleeve 91, that is mounted on the drive shaft 194 along with the sleeve 59 that carries the table-rotating worm 29, carries a cam worm 192 that meshes with a worm gear 180, Figs. 2, 3 and 10. The worms 29 and 192 are separated by a spacer sleeve 91. The before-mentioned spacer sleeve 191 separates the worm 192 from the previously described bearing 193. The worm gear 180 is splined or keyed at 189 to a shaft 182. To the upper end of the shaft 182 there is fixed a horizontally disposed plate 167. The cam 26 is fixedly mounted, in horizontal position, on the plate 167. The cam 26, therefore, is rotated by the shaft 182 in timed relation to the rotation of the table 2. The gearing is so designed, however, with the gears 28 and 180 of such diameters, that the cam 26 shall be rotated through four complete cycles of rotation corresponding to each complete rotation of the table 2. The cam 26 will therefore be rotated once corresponding to each presentation to the cutter 198 of a heel blank held by a jack.

As shown more particularly in Fig. 10, the shaft 182 is provided with upper and lower bearings 172 and 186. The mounting of the upper bearing 174 is similar to that already described for the bearing 68, illustrated clearly in Fig. 4. The upper bearing 174 is held between a lower bearing retainer 176 and an upper cap 170, corresponding to the bearing retainer 70 and the cap 64. A cover plate 172 covers a gear box 178 in which are contained the gears 180 and 192 and related mechanism. The gear box 178 is provided with oil from the oil bath 56 through an opening 119, Figs. 3 and 10.

The lower bearing 186 of the shaft 182, secured to the shaft 182 by a lock nut 188, is housed in a cap 190 at the lower end of the gear box 178. A spacer collar 184 separates the gear 180 from the bearing 186.

The cam 26 is maintained in engagement with a cam-follower roller 160 by the before-described spring 221. The cam-follower roller 160, as shown in Figs. 1, 2, 10, 13 and 16, is mounted about a cam-follower stud or shaft 168 carried by a cam-follower holder 161. The cam-follower holder 161 extends into the housing of a cam-follower bracket 169, and is prevented from rotating in the cam-follower bracket 169 by a key 163 in a keyway 123, as clearly shown in Fig. 10. The bracket 169 is bolted rigidly to the cutter-shaft-carrying arm 12, as shown in Figs. 1, 2, 13 and 16. Longitudinal adjustment of the cam-follower holder 161 in the cam-follower bracket 169 may be effected by rotating a knob 165 to turn a cam-follower-adjusting-screw shaft 166 that meshes adjustably with internally provided screw threads of the cam-follower holder 161. The shaft 166 is shown extending through a closing cap 164 for the housing of the cam-follower bracket 169. The cam-follower holder 161 may be held in longitudinally adjusted position by a clamp 162.

As the cam-follower bracket 169 is rigid with the cutter-shaft carrying arm 12, the cutter 198, at the station M, will occupy positions, relative to the path of travel of the untreated heel-blank 3 along the path of rotation of the rotary table 2, determined by the shape of the cam 26. In Fig. 25, the cam 26 is shown perfectly circular. With this circular cam 26, of course, the cutter 198 will be operated without any swinging at all. In Fig. 26, however, the cam 26 is shown with a circular portion 230 and two symmetrically disposed portions 234 and 238 between the end points 232 and 240 of the circular portion and the diametrically opposed point 236 of the cam 26.

The cutter 198 will therefore be actuated by the cam portions 234 and 238 in a direction transverse to the circular path of travel of the heel blank determined by the rotation of the table 2. By employing differently-shaped cams 26 of this character, different shapes may therefore be imparted to the regions shown at 104 in the turned heel blank 1 of Fig. 28.

According to the present invention, therefore, the turning cutting of each clamped heel blank is effected by the turning cutter 198 as the corresponding jack approaches the cutter 198 from the position P of Fig. 8 to the position Q and, at the station M, passes the position Q, and then moves away from the position Q toward the position R. This operation is controlled in accordance with the movement of the jack along the circular arc of travel of the table 2, since the rising portion 44 of the cam commences at 42, just under the position P, and terminates at 46, just under the position R.

It has been explained that the turning of the untreated heel blank 3 is effected by rotating the jack holding the untreated wedge-heel-shaped blank 3 continuously in the same direction, anticlockwise, as indicated by the arrow 47 of Fig. 8, at the operating station M, to present continuously to the cutter 198 the wedge-shaped heel blank 3 clamped thereby, commencing with the corner 341 at the front or breast edge 39 of the heel blank 3, then along the corresponding side 313 to the back, and then along its other side 313 to the opposite corner 343 at its front. Attention is invited also to the fact already referred to in connection with Figs. 24 and 24a, that different portions of the surface of revolution of the cutter 198, represented at 24, are effective to turn cut the heel blank at the different positions of the heel blank between the positions P and R. The shape that becomes thus imparted to the finished heel blank 1 by this operation, as has now been made clear, depends upon the various described adjustments and the nature of the swinging movement imparted to the cutter-carrying arm 12 by the variously shaped cams 26, as the cam 26 is rotated through its complete cycle of rotation. This swinging movement of the cutter 198 is substantially transverse to the path of circular movement of each jack toward, past and away from the cutter 198. Though the cutter 198 is immovable along this circular path, it is permitted free swinging movement transverse to this path, adjacent to the concave side of this circle, under the control of the cam 26, by the spring 221. One complete cycle of rotation of the cam 26 is effected corresponding to each untreated heel blank 3 operated on by the cutter 198. As the table 2 is provided with four jacks, therefore, as has already been stated, the cam 26 will be actuated through four complete cycles of rotation corresponding to each complete rotation of the table 2.

Not only is the untreated heel blank 3, Fig. 27, thus turn cut continuously from one corner 341 at the thin front or breast-end edge 39 of the wedge, then along its corresponding side 313 to its back 15, and finally along its opposite side 313 to the opposite corner 343 at the thin front edge 39, but also the sides of the finished heel blank 1 become hollowed out, as shown at 104 in Fig. 28.

Modification will occur to persons skilled in the art, and all such are considered to fall within the spirit and scope of the invention, as defined in the appended claims.

What is claimed is:

1. A heel-making machine having, in combination, a rotatable table, a rotatable heel-blank-clamping jack mounted to rotate with the table, a cutter for cutting the clamped heel blank, means for rotating the table to move the jack toward, past and away from the cutter, and means controlled in accordance with the rotation of the table and operable during the movement of the jack toward, past and away from the cutter to rotate the jack about an axis at an angle to the plane of rotation of the table continuously in the same direction and, during such rotation of the jack, to present the clamped heel blank continuously to the cutter commencing with a corner at the front of the heel blank, then along its corresponding side to its back, and finally along its opposite side to the opposite corner at its front.

2. A heel-making machine having, in combination, a heel-blank-clamping jack, a cutter for cutting the clamped heel blank, means for effecting relative movement between the jack and the cutter toward, past and away from each other, the jack and the cutter being relatively actuable transversely to the direction of relative movement of the jack and the cutter, means operable as the jack and the cutter relatively approach and move past and away from each other to effect relative rotation of the jack and the cutter continuously in the same direction and, during such relative rotation of the jack and the cutter, to present the clamped heel blank continuously to the cutter commencing with a corner at the front of the heel blank, then along its corresponding side to its back, and finally along its opposite side to the opposite corner at its front, and means for controlling the transverse relative actuation of the jack and the cutter irrespective of the shape of the heel blank in order that the cutter may impart to the heel blank a predetermined shape different from the shape of the heel blank.

3. A heel-making machine having, in combination, a rotatable heel-blank-clamping jack, a cutter for cutting the clamped heel blank, means for moving the jack toward, past and away from the cutter, the cutter being actuable transversely to the direction of movement of the jack, means operable as the jack approaches and moves past and away from the cutter to rotate the jack continuously in the same direction and, during such rotation of the jack, to present the clamped heel blank to the cutter commencing with a corner at the front of the heel blank, then along its corresponding side to its back, and finally along its opposite side to the opposite corner at its front, and means for controlling the transverse actuation of the cutter irrespective of the shape of the heel blank in order that the cutter may impart to the heel blank a predetermined shape different from the shape of the heel blank.

4. A heel-making machine having, in combination, a plurality of heel-blank-clamping jacks, a cutter for cutting the clamped heel blanks, means for moving the jacks successively toward the cutter to present the clamped heel blanks successively to the cutter, the cutter being actuable at an angle transversely to the direction of movement of the jacks toward and from the jacks, means comprising a cam actuable through a cycle to effect the transverse actuation of the cutter at the said angle toward and from a clamped heel blank, and means for actuating the cam through the cycle at each presentation of a clamped heel blank to the cutter.

5. A heel-making machine having, in combination, a plurality of heel-blank-clamping jacks, a cutter for cutting the clamped heel blanks, means for moving the jacks successively toward the cutter to present the clamped heel blanks successively to the cutter, the cutter being substantially immovable in the direction of movement of the jacks toward the cutter but being actuable in a direction transverse to the said direction, means comprising a cam rotatable through a cycle to effect the actuation of the cutter along the said transverse direction, and means for rotating the cam through the cycle at each presentation of a clamped heel blank to the cutter.

6. A heel-making machine having, in combination, a rotatable table, a plurality of rotatable heel-blank-clamping jacks mounted to rotate with the table, a cutter for cutting the clamped heel blanks, means for continuously rotating the table to carry the jacks successively toward, past and away from the cutter, means operable as each jack approaches and moves past and away from the cutter to rotate the corresponding jack continuously in the same direction and, during the rotation of the jack, to present the correspondingly clamped heel blank continuously to the cutter commencing with a corner at the front of the heel blank, then along its corresponding side to its back, and finally along its opposite side to the opposite corner at its front, means actuable through a cycle to control the operation of the cutter upon the clamped heel blanks, means for actuating the actuable means, and means connecting the actuating means to the table-rotating means to effect, during each rotation of the table, a plurality of actuations of the actuable means through the cycle equal in number to the plurality of jacks, thereby to effect an actuation of the actuable means through the cycle as each clamped heel blank successively approaches and moves past and away from the cutter.

7. A machine of the class described having, in combination, a plurality of work-holding means, a cutter for cutting the work held by the work-holding means, means for moving the work-holding means successively toward the cutter to present the work held by the work-holding means successively to the cutter, the cutter being substantially immovable in the direction of movement of the work-holding means toward the cutter but being actuable at an angle to the said direction toward and from the work-holding means, means actuable through a cycle to effect the actuation of the cutter at the said angle toward and from the work held by a work-holding means, and means for actuating the actuable means through the cycle at each presentation of the work held by a work-holding means to the cutter.

8. A machine of the class described, having, in combination, a plurality of work-holding means, means for operating upon the work held by the work-holding means, means for moving the work-holding means successively toward, past and away from the operating means, means comprising a cam rotatable through a cycle to control the operation of the operating means, and means for rotating the cam through the cycle as each work-holding means approaches and moves past and away from the operating means.

9. A machine of the class described, having, in combination, a plurality of work-holding means, a cutter for cutting the work held by the work-holding means, means for moving the work-holding means successively toward, past and away from the cutter, means comprising a cam rotatable through a cycle to control the operation of the cutter, and means for rotating the cam through the cycle as each work-holding means approaches and moves past and away from the cutter.

10. A machine of the class described, having, in combination, a plurality of work-holding means, means for operating upon the work held by the work-holding means, means for moving the work-holding means along a predetermined path successively toward the operating means, the operating means being actuable through an operating-means cycle in a direction at an angle to the path, a cam actuable through a cam cycle, means for controlling the operation of the cam and the operating means to cause the operating means to occupy a predetermined position in the operating-means cycle corresponding to each position of the cam in the cam cycle, and means for actuating the cam through the cam cycle once corresponding to the movement of each work-holding means toward the operating means to effect an actuation of the operating means through the operating-means cycle under the control of the cam once corresponding to each movement of a work-holding means toward the operating means.

11. A heel-making machine having, in combination, a heel-blank-clamping jack, a cutter for cutting the clamped heel blank, means for effecting relative movement between the jack and the cutter toward each other to present the clamped heel blank to the cutter, the cutter being actuable in a direction transverse to the direction of relative movement of the jack and the cutter, means operable when the clamped heel blank is presented to the cutter to effect relative rotation of the jack and the cutter continuously in the same direction and, during such relative rotation of the jack and the cutter, to present the clamped heel blank continuously to the cutter commencing with a corner at the front of the heel blank, then along its corresponding side to its back, and finally along its opposite side to the opposite corner at its front, an actuable cam, means for controlling the operation of the cam and the cutter to cause the cutter to occupy a predetermined position along the said transverse direction corresponding to each position of the cam, and means for actuating the cam to effect actuation of the cutter along the said transverse direction during the presentation of the clamped blank to the cutter.

12. A heel-making machine having, in combination, a plurality of heel-blank-clamping jacks, a cutter for cutting the clamped heel blanks, means for moving the jacks along a predetermined path successively toward the cutter, the cutter being actuable through a cutter cycle in a direction at an angle to the path, a cam actuable through a cam cycle, means for controlling the operation of the cam and the cutter to cause the cutter to occupy a predetermined position in the cutter cycle corresponding to each position of the cam in the cam cycle, and means for actuating the cam through the cam cycle once corresponding to the movement of each jack toward the cutter to effect an actuation of the cutter through the cutter cycle under the control of the cam once corresponding to each movement of a jack toward the cutter.

13. A heel-making machine having, in combination, a plurality of rotatable heel-blank-clamping jacks, a cutter for cutting the clamped heel blanks, means for moving the jacks along a predetermined path successively toward, past and away from the cutter, means operable as each jack approaches and moves past and away from the cutter to rotate the corresponding jack continuously in the same direction and, during the rotation of the jack, to present the correspondingly clamped heel blank continuously to the cutter commencing with a corner at the front of the heel blank, then along its corresponding side to its back, and finally along its opposite side to the opposite corner at its front, the cutter being actuable through a cutter cycle in a direction at an angle to the path, a cam actuable through a cam cycle, means for controlling the operation of the cam and the cutter to cause the cutter to occupy a predetermined position in the cutter cycle corresponding to each position of the cam in the cam cycle, and means for actuating the cam through the cam cycle once corresponding to the movement of each jack toward, past and away from the cutter to effect an actuation of the cutter through the cutter cycle under the control of the cam once corresponding to each movement of a jack toward, past and away from the cutter.

14. A machine for turning heel blanks each provided with a front, a back, side faces, a tread face and a heel-attaching-portion face having, in combination, a jack provided with means for engaging the tread face and the heel-attaching-portion face in order to clamp the heel blank, a rotatable turning cutter for turn-cutting the clamped heel blank provided with turning-cutter edges revolvable about the axis of rotation of the cutter during the rotation of the cutter, means for rotating the cutter about its axis, means for effective relative movement between the jack and the cutter toward, past and away from each other to carry the clamped heel blank and the path of revolution of the revolving cutter edges into, past and away from each other, and means operable as the clamped heel blank and the path of revolution of the revolving cutter edges are carried into, past and away from each other to effect relative rotation of the jack and the cutter continuously in the same direction and, during such relative rotation of the jack and the cutter, to carry the side faces of the clamped heel blank and the path of revolution of the revolving cutter edges continuously into each other commencing with a corner at the front of the heel blank, then along its corresponding side to its back, and finally along its opposite side to the opposite corner at its front to turn-cut the clamped heel blank continuously along its side faces and its back between the said corners.

15. A machine for turning heel blanks each provided with a front, a back, side faces, a tread face and a heel-attaching-portion face having, in combination, a rotatable jack provided with means for engaging the tread face and the heel-attaching-portion face in order to clamp the heel blank, a rotatable turning cutter for turn-cutting the clamped heel blank provided with turning-cutter edges revolvable about the axis of rotation of the cutter during the rotation of the cutter, means for rotating the cutter about its axis, means for effecting relative movement between the jack and the cutter toward, past and away from each other to carry the clamped heel blank and the path of revolution of the revolving cutter edges into, past and away from each other, and means operable as the clamped heel blank and the path of revolution of the revolving cutter edges are carried into, past and away from each other to rotate the jack continuously in the same direction and, during such rotation of the jack, to carry the side faces of the clamped heel blank and the path of revolution of the revolving cutter edges continuously into each other commencing with a corner at the front of the heel blank, then along its corresponding side to its back, and finally along its opposite side to the opposite corner at its front to turn-cut the clamped heel blank continuously along its side faces and its back between the said corners.

16. A machine for turning heel blanks each provided with a front, a back, side faces, a tread face and a heel-attaching-portion face having, in combination, a rotatable jack provided with means for engaging the tread face and the heel-attaching-portion face in order to clamp the heel blank, a rotatable turning cutter for turn-cutting the clamped heel blank provided with turning-cutter edges revolvable about the axis of rotation of the cutter during the rotation of the cutter, means for rotating the cutter about its axis, means for moving the jack toward, past and away from the cutter to carry the clamped heel blank into, past and away from the path of revolution of the revolving cutter edges, and means operable as the clamped heel blank is carried into, past and away from the path of revolution of the revolving cutter edges to rotate the jack continuously in the same direction and, during such rotation of the jack, to carry the side faces of the clamped heel blank continuously into the path of revolution of the revolving cutter edges commencing with a corner at the front of the heel blank, then along its corresponding side to its back, and finally along its opposite side to the opposite corner at its front to turn-cut the clamped heel blank continuously along its side faces and its back between the said corners.

17. A machine for turning heel blanks each provided with a front, a back, side faces, a tread face and a heel-attaching-portion face having, in combination, a jack provided with means for engaging the tread face and the heel-attaching-portion face in order to clamp the heel blank, a rotatable turning cutter for turn-cutting the clamped heel blank provided with turning-cutter edges revolvable about the axis of rotation of the cutter during the rotation of the cutter to provide a cutting surface of revolution, means for rotating the cutter about its axis, means for effecting relative movement between the jack and the cutter toward, past and away from each other to carry the clamped heel blank and the path of revolution of the revolving cutter edges into, past and away from each other, and means operable as the clamped heel blank and the path of revolution of the revolving cutter edges are carried into, past and away from each other to effect relative rotation of the jack and the cutter continuously in the same direction and, during such relative rotation of the jack and the cutter, to carry the side faces of the clamped heel blank and the path of revolution of the revolving cutter edges continuously into each other commencing with a corner at the front of the heel blank at one portion of the cutting surface of revolution, then along its corresponding side to its back at successively disposed further portions of the cutting surface of revolution, and finally along its opposite side to the opposite corner at its front to turn-cut the clamped heel blank continuously along its side faces and its back between the said corners.

18. A machine for turning heel blanks each provided with a front, a back, side faces, a tread face and a heel-attaching portion face having, in combination, a jack rotatable about an axis provided with means for engaging the tread face and the heel-attaching-portion face in order to clamp the heel blank, a rotatable turning cutter for turn-cutting the clamped heel blank provided with turning-cutter edges revolvable about the axis of rotation of the cutter during the rotation of the cutter, means for rotating the cutter about its axis, means for effecting relative movement between the jack and the cutter along a predetermined path toward, past and away from each other to carry the clamped heel blank and the path of revolution of the revolving cutter edges into, past and away from each other, the points at which the engaging means of the jack engage the tread face and the heel-attaching-portion face being eccentric to the axis of rotation of the jack in order that the said eccentric points of engagement shall travel along a path that is not parallel to the predetermined path, and means for rotating the jack continuously in the same direction and, during such rotation of the jack, carrying the side faces of the clamped heel blank and the path of revolution of the revolving cutter edges continuously into each other commencing with a corner at the front of the heel blank, then along its corresponding side to its back, and finally along its opposite side to the opposite corner at its front to turn-cut the clamped heel blank continuously along its side faces and its back between the said corners.

19. A machine for turning heel blanks each provided with a front, a back, side faces, a tread face and a heel-attaching-portion face having, in combination, a jack rotatable about an axis provided with means for engaging the tread face and the heel-attaching-portion face in order to clamp the heel blank, a rotatable turning cutter for turn-cutting the clamped heel blank provided with turning-cutter edges revolvable about the axis of rotation of the cutter during the rotation of the cutter, means for rotating the cutter about its axis, means for moving the jack along a predetermined path toward, past and away from the cutter to carry the clamped heel blank into, past and away from the path of revolution of the revolving cutter edges, the points at which the engaging means of the jack engage the tread face and the heel-attaching-portion face being eccentric to the axis of rotation of the jack in order that the said eccentric points of engagement shall travel along a path that is not parallel to the predetermined path, and means for rotating the jack continuously in the same direction and, during such rotation of the jack, carrying the side faces of the clamped heel blank continuously into the path of revolution of the revolving cutter edges commencing with a corner at the front of the heel blank, then along its corresponding side to its back, and finally along its opposite side to the opposite corner at its front to turn-cut the clamped heel blank continuously along its side faces and its back between the said corners.

20. A machine for turning wedge-heel blanks each provided with a front having a thin edge, a back having a thick edge, side faces, a tread face and a heel-attaching-portion face having, in combination, a jack provided with means for engaging the tread face and the heel-attaching-portion face in order to clamp the wedge-heel blank, a rotatable turning cutter for turn-cutting the clamped wedge-heel blank provided with turning-cutter edges revolvable about the axis of rotation of the cutter during the rotation of the cutter to provide a cutting surface of revolution, means for rotating the cutter about its axis, means for effecting relative movement between the jack and the cutter along a predetermined path toward, past and away from each other to carry the clamped wedge-heel blank and the path of the revolution of the revolving cutter edges into, past and away from each other, and means operable as the clamped wedge-heel blank and the path of revolution of the revolving cutter edges are carried into, past and away from each other to effect relative rotation of the jack and the cutter continuously in the same direction and, during such relative rotation of the jack and the cutter, to carry the side faces of the clamped wedge-heel blank and the path of revolution of the revolving cutter edges continuously into each other commencing with a corner at the front thin edge of the wedge-heel blank at one portion of the cutting surface of revolution, then along its corresponding side to its back thick edge at successively disposed further portions of the cutting surface of revolution, and finally along its opposite side to the opposite corner at its front thin edge to turn-cut the clamped heel blank continuously along its side faces and its back between the said corners, the points at which the engaging means of the jack engage the tread face and the heel-attaching-portion face being eccentric to the axis of relative rotation of the jack and the cutter in order that the said eccentric points of engagement shall travel along a path that is not parallel to the predetermined path.

21. A machine for turning wedge-heel blanks each provided with a front having a thin edge, a back having a thick edge, side faces, a tread face and a heel-attaching-portion face having, in combination, a rotatable jack provided with means for engaging the tread face and the heel-attaching-portion face in order to clamp the wedge-heel blank, a rotatable turning cutter for turn-cutting the clamped wedge-heel blank provided with turning-cutter edges revolvable about the axis of rotation of the cutter during the rotation of the cutter to provide a cutting surface of revolution, means for rotating the cutter about its axis, means for moving the jack along a predetermined path toward, past and away from the cutter to carry the clamped wedge-heel blank into, past and away from the path of revolution of the revolving cutter edges, the points at which the engaging means of the jack engages the tread face and the heel-attaching-portion face being eccentric to the axis of rotation of the jack in order that the said eccentric points of engagement shall travel along a path that is not parallel to the predetermined path, and means operable as the clamped wedge-heel blank is carried into, past and away from the path of revolution of the revolving cutter edges to rotate the jack continuously in the same direction and, during such rotation of the jack, to carry the side faces of the clamped wedge-heel blank continuously into the path of revolution of the revolving cutter edges commencing with a corner at the front thin edge of the wedge-heel blank at one portion of the cutting surface of revolution, then along its corresponding side to its back thick edge at successively disposed further portions of the cutting surface of revolution, and finally along its opposite side to the opposite corner at its front thin edge to turn-cut the clamped heel blank continuously along its side faces and its back between the said corners.

22. A machine for turning heel blanks each provided with a front, a back, side faces, a tread face and a heel-attaching-portion face having, in combination, two members, namely, a rotatable jack provided with means for engaging the tread face and the heel-attaching-portion face in order to clamp the heel blank and a rotatable turning cutter for turn-cutting the clamped heel blank provided with turning-cutter edges revolvable about the axis of rotation of the cutter during the rotation of the cutter, means for rotating the cutter about its axis, means for effecting relative movement between the jack and the cutter along a predetermined path toward, past and away from each other to carry the clamped heel blank and the path of revolution of the revolving cutter edges into, past and away from each other, one of the members being substantially immovable along the predetermined path, and means operable as the clamped heel blank and the path of revolution of the revolving cutter edges are carried into, past and away from each other to rotate the jack continuously in the same direction and, during such rotation of the jack, to carry the side faces of the clamped heel blank and the path of revolution of the revolving cutter edges continuously into each other commencing with a corner at the front of the heel blank, then along its corresponding side to its back, and finally along its opposite side to the opposite corner at its front to turn-out the clamped heel blank continuously along its side faces and its back between the said corners.

23. A machine for turning heel blanks each provided with a front, a back, side faces, a tread face and a heel-attaching-portion face having, in combination, two members, namely, a rotatable jack provided with means for engaging the tread face and the heel-attaching-portion face in order to clamp the heel blank and a rotatable turning cutter for turn-cutting the clamped heel blank provided with turning-cutter edges revolvable about the axis of rotation of the cutter during the rotation of the cutter, means for rotating the cutter about its axis, means for effecting relative movement between the jack and the cutter along a curved path toward, past and away from each other to carry the clamped heel blank and the path of revolution of the revolving cutter edges into, past and away from each other, one of the members being positioned adjacent to the concave side of the curved path and being substantially immovable along the path, and means operable as the clamped heel blank and the path of revolution of the revolving cutter edges are carried into, past and away from each other to rotate the jack continuously in the same direction and, during such rotation of the jack, to carry the side faces of the clamped heel blank and the path of revolution of the revolving cutter edges continuously into each other commencing with a corner at the front of the heel blank, then along its corresponding side to its back, and finally along its opposite side to the opposite corner at its front to turn-cut the clamped heel blank cotninuously along its side faces and its back between the said corners.

24. A machine for turning heel blanks each provided with a front, a back, side faces, a tread face and a heel-attaching-portion face having, in combination, a rotatable jack provided with means for engaging the tread face and the heel-attaching-portion face in order to clamp the heel blank, a rotatable turning cutter for turn-cutting the clamped heel blank provided with turning-cutter edges revolvable about the axis of rotation of the cutter during the rotation of the cutter, means for rotating the cutter about its axis, means for moving the jack along a curved path toward, past and away from the cutter to carry the clamped heel blank into, past and away from the path of revolution of the revolving cutter edges, the cutter being positioned adjacent to the concave side of the curved path, and means operable as the clamped heel blank is carried into, past and away from the path of revolution of the revolving cutter edges to rotate the jack continuously in the same direction and, during such rotation of the jack, to carry the side faces of the clamped heel blank continuously into the path of revolution of the revolving cutter edges commencing with a corner at the front of the heel blank, then along its corresponding side to its back, and finally along its opposite side to the opposite corner at its front to turn-cut the clamped heel blank continuously along its side faces and its back between the said corners.

25. A machine for turning heel blanks each provided with a front, a back, side faces, a tread face and a heel-attaching-portion face having, in combination, a rotatable jack provided with means for engaging the tread face and the heel-attaching-portion face in order to clamp the heel blank, a rotatable turning cutter for turn-cutting the clamped heel blank provided with turning-cutter edges revolvable about the axis of rotation of the cutter during the rotation of the cutter, means for rotating the cutter about its axis, means for effecting relative movement between the jack and the cutter toward, past and away from each other to carry the clamped heel blank and the path of revolution of the revolving cutter edges into, past and away from each other, and means operable during a first portion of the said relative movement of the jack and the cutter toward each other to rotate the jack in one direction, operable thereafter, as the jack and the cutter relatively approach and move past and away from each other relatively to carry the clamped heel blank and the path of revolution of the revolving cutter edges into, past and away from each other, to rotate the jack continuously in the opposite direction and, during such rotation of the jack in the said opposite direction, to carry the side faces of the clamped heel blank and the path of revolution of the revolving cutter edges continuously into each other commencing with a corner at the front of the heel blank, then along its corresponding side to its back, and finally along its opposite side to the opposite corner at its front to turn-cut the clamped heel blank continuously along its side faces and its back between the said corners, and operable finally, during the further portion of the said relative movement of the jack and the cutter away from each other, to rotate the jack in the said one direction.

26. A machine for turning heel blanks each provided with a front, a back, side faces, a tread face and a heel-attaching-portion face having, in combination, a rotatable jack provided with means for engaging the tread face and the heel-attaching-portion face in order to clamp the heel blank, a rotatable turning cutter for turn-cutting the clamped heel blank provided with turning-cutter edges revolvable about the axis of rotation of the cutter during the rotation of the cutter, means for rotating the cutter about its axis, means for moving the jack toward, past and away from the cutter to carry the clamped heel blank into, past and away from the path of revolution of the revolving cutter edges, and means operable during a first portion of the said movement of the jack toward the cutter to rotate the jack in one direction, operable thereafter, as the jack approaches and moves past and away from the cutter to carry the clamped heel blank into, past and away from the path of revolution of the revolving cutter edges, to rotate the jack continuously in the opposite direction and, during such rotation of the jack in the said opposite direction, to carry the side faces of the clamped heel blank continuously into the path of revolution of the revolving cutter edges commencing with a corner at the front of the heel blank, then along its corresponding side to its back, and finally along its opposite side to the opposite corner at its front to turn-cut the clamped heel blank continuously along its side faces and its back between the said corners, and operable finally, during the further portion of said movement of the jack away from the cutter, to rotate the jack in the said one direction.

27. A machine for turning heel blanks each provided with a front, a back, side faces, a tread face and and a heel-attaching-portion face having, in combination, a normally ineffective rotatable jack provided with means for engaging the tread face and the heel-attaching-portion face in order to clamp the heel blank, a rotatable turning cutter for turn-cutting the clamped heel blank provided with turning-cutter edges revolvable about the axis of rotation of the cutter during the rotation of the cutter, means for rotating the cutter about its axis, means for effecting relative movement between the jack and the cutter along a predetermined path toward, past and away from each other to carry the clamped heel blank and the path of revolution of the revolving cutter edges into, past and away from each other, means for causing the engaging means of the jack to engage both the tread face and the heel-attaching-portion face of the heel blank at a predetermined point in the predetermined path to render the jack effective to clamp the heel blank prior to its reaching the cutter, means operable as the clamped heel blank and the path of revolution of the revolving cutter edges are carried into, past and away from each other to rotate the jack continuously in the same direction and, during such rotation of the jack, to carry the side faces of the clamped heel blank and the path of revolution of the revolving cutter edges continuously into each other commencing with a corner at the front of the heel blank, then along its corresponding side to its back, and finally along its opposite side to the opposite corner at its front to turn-cut the clamped heel blank continuously along its side faces and its black between the said corners, and means for rendering the jack ineffective to clamp the heel blank at a second predetermined point in the predetermined path to release the heel blank after it has been turn-cut by the cutter.

28. A machine for turning heel blanks each provided with a front, a back, side faces, a tread face and a heel-attaching-portion face having, in combination, a plurality of rotatable jacks each provided with means for engaging the tread face and the heel-attaching-portion face of a heel blank in order to clamp the heel blank, a rotatable turning cutter for turn-cutting the clamped heel blank provided with turning-cutter edges revolvable about the axis of rotation of the cutter during the rotation of the cutter, means for rotating the cutter about its axis, means for effecting relative movement between the jacks and the cutter successively toward, past and away from each other to carry each clamped heel blank and the path of revolution of the revolving cutter edges into, past and away from each other, and means operable as each clamped heel blank and the path of revolution of the revolving cutter edges are carried into, past and away from each other to rotate the jack by which such heel blank is clamped continuously in the same direction and, during such rotation of the said jack, to carry the side faces of the clamped heel blank and the path of revolution of the revolving cutter edges continuously into each other commencing with a corner at the front of the heel blank, then along its corresponding side to its back, and finally along its opposite side to the opposite corner at its front to turn-cut the clamped heel blank continuously along its side faces and its back between the said corners.

29. A machine for turning heel blanks each provided with a front, a back, side faces, a tread face and a heel-attaching-portion face, the machine being provided with a loading station and an operating station and having, in combination, a support, a plurality of normally ineffective rotatable jacks carried by the support each adapted to be supplied with a heel blank at the loading station and each provided with means for engaging the tread face and the heel-attaching-portion face of the heel blank in order to clamp the heel blank, a rotatable turning cutter for turn-cutting the clamped heel blanks disposed at the operating station and provided with turning-cutter edges revolvable about the axis of rotation of the cutter during the rotation of the cutter, means for rotating the cutter about its axis, means for moving the support along a predetermined path to transport the jacks successively from the loading station toward, past and away from the cutter at the operating station to carry the clamped heel blanks into, past and away from the path of revolution of the revolving cutter edges, means for causing the engaging means of the jacks successively to engage both the tread faces and the heel-attaching-portion faces of the heel blanks at a predetermined point in the predetermined path to render the jacks successively effective at the predetermined point to clamp the heel blanks prior to their reaching the cutter, means operable as each clamped heel blank is carried into, past and away from the path of revolution of the revolving cutter edges to rotate the jack by which such heel blank is carried in the neighborhood of the operating station continuously in the same direction and, during such rotation of said jack, to carry the side faces of the clamped heel blank continuously into the path of revolution of the revolving cutter edges commencing with a corner at the front of the heel blank, then along its corresponding side to its back, and finally along its opposite side to the opposite corner at its front to turn-cut the clamped heel blank continuously along its side faces and its back between the said corners, and means for rendering the jacks successively ineffective to clamp the heel blanks at a second predetermined point in the predetermined path to release the heel blanks successively after they have been successively turn-cut by the cutter.

30. A heel-making machine having, in combination, a rotatable table, a plurality of heel-blank-clamping jacks mounted to rotate with the table, a cutter for cutting the clamped heel blanks, means for rotating the table to carry the jacks successively toward, past and away from the cutter, the cutter being substantially immovable in the direction of rotation of the table but being actuable in a direction at an angle to the said direction of rotation, means actuable through a cycle to effect the actuation of the cutter along the direction at the said angle, and means for actuating the actuable means through the cycle as each jack successively approaches and moves past and away from the cutter.

31. A heel-making machine having, in combination, a plurality of heel-blank-clamping jacks, a cutter for cutting the clamped heel blanks, means for moving the jacks successively toward the cutter to present the clamped heel blanks successively to the cutter, the cutter being substantially immovable in the direction of movement of the jacks toward the cutter but being actuable in a direction transverse to the said direction, means actuable through a cycle to effect the actuation of the cutter along the said transverse direction, and means for actuating the actuable means through the cycle at each presentation of a clamped heel blank to the cutter.

32. A machine of the class described having, in combination, a plurality of work-holding means, means for operating upon the work held by the work-holding means, means for moving the work-holding means successively toward, past and away from the operating means, the operating means being substantially immovable in the direction of movement of the work-holding means toward the operating means but being actuable in a direction at an angle to the said direction of movement, means actuable through a cycle to effect the actuation of the operating means along the direction at the said angle, and means for actuating the actuable means through the cycle as each work-holding means approaches and moves past and away from the operating means.

33. A machine of the class described having, in combination, a plurality of work-holding means, means for operating upon the work held by the work-holding means, means for moving the work-holding means successively toward, past and away from the operating means in succession, the operating means being substantially immovable in the direction of movement of the work-holding means toward the operating means but being actuable in a direction at an angle to the said direction of movement, means comprising a cam actuable through a cycle to effect the actuation of the operating means along the direction at the said angle, and means for actuating the cam through the cycle as each work-holding means relatively approaches and moves past and away from the operating means.

34. A heel-making machine having, in combination, a rotatable table, a plurality of heel-blank-clamping jacks mounted to rotate with the table, a cutter for cutting the clamped heel blanks, means for rotating the table to carry the jacks successively toward, past and away from the cutter, the cutter being substantially immovable in the direction of rotation of the table, means comprising a cam actuable through a cycle to control the operation of the cutter upon the clamped heel blanks, means for actuating the cam, and means connecting the cam to the table-rotating means to effect, during each rotation of the table, a plurality of actuations of the cam through the cycle equal in number to the plurality of jacks, thereby to effect an actuation of the cam through the cycle as each clamped heel blank successively approaches and moves past and away from the cutter.

35. A heel-making machine having, in combination, a rotatable table, a plurality of heel-blank-clamping jacks mounted to rotate with the table, a cutter for cutting the clamped heel blanks, means for rotating the table to carry the jacks successively toward, past and away from the cutter, means comprising a cam rotatable through a cycle to control the operation of the cutter upon the clamped heel blanks, means for rotating the cam, and means connecting the cam-rotating means to the table-rotating means to effect, during each rotation of the table, a plurality of rotations of the cam through the cycle equal in number to the plurality of jacks, thereby to effect a rotation of the cam through the cycle as each clamped heel blank successively approaches and moves past and away from the cutter.

36. A machine of the class described having, in combination, a rotatable table, a plurality of work-holding clamps mounted to rotate with the table, means for operating upon the clamped work, the operating means being movable transversely to the circular path of travel of the clamps determined by the rotation of the table, means for rotating the table in order to carry the clamps successively toward, past and away from the operating means, thereby to present the work clamped by the clamps successively to the operating means, a cam shaft for supporting any of a plurality of differently shaped cams each operable to actuate the operating means transversely to the said circular path of travel of the clamps to cause the operating means to operate upon the work presented thereto by the clamps differently as determined by the different shapes of the different cams, and means for rotating the cam shaft once corresponding to each presentation to the operating means of the work by a clamp.

37. A machine of the class described having, in combination, a rotatable table, a plurality of work-holding clamps mounted to rotate with the table, a cutter for cutting the clamped work, the cutter being movable transversely to the circular path of travel of the clamps determined by the rotation of the table, means for rotating the table in order to carry the clamps successively toward, past and away from the cutter, thereby to present the work clamped by the clamps successively to the cutter, a cam shaft for supporting any of a plurality of differently shaped cams each operable to actuate the cutter transversely to the said circular path of travel of the clamps to cause the cutter to cut the work presented thereto by the clamps to different shapes as determined by the different shapes of the different cams, and means for rotating the cam shaft once corresponding to each presentation to the cutter of the work by a clamp.

38. A machine of the class described having, in combination, a rotatable table, a plurality of work-holding clamps mounted to rotate with the table, means for operating upon the clamped work, the operating means being movable transversely to the circular path of travel of the clamps determined by the rotation of the table, means for yieldingly biasing the operating means in one direction of movement transverse to the said circular path of travel of the clamps, means for rotating the table in order to carry the clamps successively toward, past and away from the operating means, thereby to present the work clamped by the clamps successively to the operating means, a cam shaft for supporting any of a plurality of differently shaped cams each operable in opposition to the action of the yieldingly biasing means to actuate the operating means transversely to the said circular path of travel of the clamps to cause the operating means to operate upon the work presented thereto by the clamps differently as determined by the different shapes of the different cams, and means for rotating the cam shaft once corresponding to each presentation to the operating means of the work by a clamp.

39. A machine of the class described having, in combination, a rotatable table, a plurality of work-holding clamps mounted to rotate with the table, a cutter for cutting the clamped work, the cutter being movable transversely to the circular path of travel of the clamps determined by the rotation of the table, means for yieldingly biasing the cutter in one direction of movement transverse to the said circular path of travel of the clamps, means for rotating the table in order to carry the clamps successively toward, past and away from the cutter, thereby to present the work clamped by the clamps successively to the cutter, a cam shaft for supporting any of a plurality of differently shaped cams each operable in opposition to the action of the yieldingly biasing means to actuate the cutter transversely to the said circular path of travel of the clamps to cause the cutter to cut the work presented thereto by the clamps to different shapes as determined by the different shapes of the different cams, and means for rotating the cam shaft once corresponding to each presentation to the cutter of the work by a clamp.

40. A machine of the class described provided with a loading station and an operating station having, in combination, a rotatable table, a plurality of work-holding clamps mounted to rotate with the table adapted to be successively supplied with work at the loading station, the clamps being ineffective to clamp the work at the loading station, means for rendering the clamps successively effective to clamp the work at a predetermined point in the path of rotation of the table between the loading station and the operating station, means for operating upon the clamped work disposed at the operating station, the operating means being substantially immovable along but being movable transversely to the circular path of travel of the clamps determined by the rotation of the table, means for yieldingly biasing the operating means in one direction of movement transverse to the said circular path of travel of the clamps, means for rotating the table in order to carry the clamps successively from the loading station toward, past and away from the operating means at the operating station, thereby to present the work clamped by the clamps successively to the operating means at the operating station, a cam shaft for supporting any of a plurality of differently shaped cams each operable in opposition to the action of the yieldingly biasing means to actuate the operating means at the operating station transversely to the said circular path of travel of the clamps to cause the operating means to operate upon the work presented thereto by the clamps differently as determined by the different shapes of the different cams, means for rotating the cam shaft once corresponding to each presentation to the operating means at the operating station of the work by a clamp, and means for rendering the clamps successively ineffective at a second predetermined point in the path of rotation of the table after they have traveled past the operating means at the operating station to release the work after it has been operated upon by the operating means.

41. A machine of the class described provided with a loading station and an operating station having, in combination, a rotatable table, a plurality of work-holding clamps mounted to rotate with the table adapted to be successively supplied with work at the loading station, the clamps being ineffective to clamp the work at the loading station, means for rendering the clamps successively effective to clamp the work at a predetermined point in the path of rotation of the table between the loading station and the operating station, a cutter for cutting the clamped work disposed at the operating station, the cutter being substantially immovable along but being movable transversely to the circular path of travel of the clamps determined by the rotation of the table, means for yieldingly biasing the cutter in one direction of movement transverse to the said circular path of travel of the clamps, means for rotating the table in order to carry the clamps successively from the loading station toward, past and away from the cutter at the operating station, thereby to present the work clamped by the clamps successively to the cutter at the operating station, a cam shaft for supporting any of a plurality of differently shaped cams each operable in opposition to the action of the yieldingly biasing means to actuate the cutter at the operating station transversely to the said circular path of travel of the clamps to cause the cutter to cut the work presented thereto by the clamps to different shapes as determined by the different shapes of the different cams, means for rotating the cam shaft once corresponding to each presentation to the cutter at the operating station of the work by a clamp, and means for rendering the clamps successively ineffective at a second predetermined point in the path of rotation of the table after they have traveled past the cutter at the operating station to release the work after it has been cut by the cutter.

42. A machine of the class described provided with a loading station and an operating station having, in combination, a rotatable table provided with a circumferentially disposed gear, a plurality of work-holding clamps mounted to rotate with the table adapted to be successively supplied with work at the loading station, the clamps being ineffective to clamp the work at the loading station, means for rendering the clamps successively effective to clamp the work at a predetermined point in the path of rotation of the table between the loading station and the operating station, means for operating upon the clamped work disposed at the operating station, the operating means being substantially immovable along but being movable transversely to the circular path of travel of the clamps determined by the rotation of the table, means for yiedlingly biasing the operating means in one direction of movement transverse to the said circular path of travel of the clamps, a drive shaft having a worm meshing with the gear, means for driving the drive shaft to rotate the table in order to carry the clamps successively from the loading station toward, past and away from the operating means at the operating station, thereby to present the work clamped by the clamps successively to the operating means at the operating station, a cam shaft for supporting any of a plurality of differently shaped cams each operable in opposition to the action of the yieldingly biasing means to actuate the operating means at the operating station transversely to the said circular path of travel of the clamps to cause the operating means to operate upon the work presented thereto by the clamps differently as determined by the different shapes of the different cams, a gear for rotating the cam shaft, a worm driven by the drive shaft meshing with the cam-shaft gear to drive the cam shaft, the gears being of diameters to effect a rotation of the cam shaft once corresponding to each presentation to the operating means at the operating station of the work by a clamp, and means for rendering the clamps successively ineffective at a second predetermined point in the path of rotation of the table after they have traveled past the operating means at the operating station to release the work after it has been operated upon by the operating means.

43. A machine of the class described provided with a loading station and an operating station having, in combination, a rotatable table provided with a circumferentially disposed gear, a plurality of work-holding clamps mounted to rotate with the table adapted to be successively supplied with work at the loading station, the clamps being ineffective to clamp the work at the loading station, means for rendering the clamps successively effective to clamp the work at a predetermined point in the path of rotation of the table between the loading station and the operating station, a cutter for cutting the clamped work disposed at the operating station, the cutter being substantially immovable along but being movable transversely to the circular path of travel of the clamps determined by the rotation of the table, means for yieldingly biasing the cutter in one direction of movement transverse to the said circular path of travel of the clamps, a drive shaft having a worm meshing with the gear, means for driving the drive shaft to rotate the table in order to carry the clamps successively from the loading station toward, past and away from the cutter at the operating station, thereby to present the work clamped by the clamps successively to the cutter at the operating station, a cam shaft for supporting any of a plurality of differently shaped cams each operable in opposition to the action of the yieldingly biasing means to actuate the cutter at the operating station transversely to the said circular path of travel of the clamps to cause the cutter to cut the work presented thereto by the clamps to different shapes as determined by the different shapes of the different cams, a gear for rotating the cam shaft, a worm driven by the drive shaft meshing with the cam-shaft gear to drive the cam-shaft, the gears being of diameters to effect a rotation of the cam shaft once corresponding to each presentation to the cutter at the operating station of the work by a clamp, and means for rendering the clamps successively ineffective at a second predetermined point in the path of rotation of the table after they have traveled past the cutter at the operating station to release the work after it has been cut by the cutter.

44. A heel-making machine having, in combination, a rotatable table, a plurality of heel-blank-clamping jacks mounted to rotate with the table, a cutter for cutting the clamped heel blanks, the cutter being movable transversely to the circular path of travel of the jacks determined by the rotation of the table, means for rotating the table in order to carry the jacks successively toward, past and away from the cutter, thereby to present the heel blanks clamped by the jacks successively to the cutter, a cam shaft for supporting any of a plurality of differently shaped cams each operable to actuate the cutter transversely to the said circular path of travel of the jacks to cause the cutter to cut the heel blanks presented thereto by the jacks to different shapes as determined by the different shapes of the different cams, and means for rotating the cam shaft once corresponding to each presentation to the cutter of a heel blank by a jack.

45. A heel-making machine having, in combination, a rotatable table, a plurality of heel-blank-clamping jacks mounted to rotate with the table, a cutter for cutting the clamped heel blanks, the cutter being movable transversely to the circular path of travel of the jacks determined by the rotation of the table, means for yieldingly biasing the cutter in one direction of movement transverse to the said circular path of travel of the jacks, means for rotating the table in order to carry the jacks successively toward, past and away from the cutter, thereby to present the heel blanks clamped by the jacks successively to the cutter, a cam shaft for supporting any of a plurality of differently shaped cams each operable in opposition to the action of the yieldingly biasing means to actuate the cutter transversely to the said circular path of travel of the jacks to cause the cutter to cut the heel blanks presented thereto by the jacks to different shapes as determined by the shapes of the different cams, and means for rotating the cam shaft once corresponding to each presentation to the cutter of a heel blank by a jack.

46. A heel-making machine having, in combination, a rotatable table, a plurality of rotatable heel-blank-clamping jacks mounted to rotate with the table, a cutter for cutting the clamped heel blanks, the cutter being movable transversely to the circular path of travel of the jacks determined by the rotation of the table, means for yieldingly biasing the cutter in one direction of movement transverse to the said circular path of travel of the jacks, means for rotating the table in order to carry the jacks successively toward, past and away from the cutter, thereby to present the heel blanks clamped by the jacks successively to the cutter, means controlled in accordance with the travel of the jacks along the said circular path and operable as each jack approaches and moves past and away from the cutter to rotate the corresponding jack in the neighborhood of the operationg station continuously in the same direction and, during such rotation of the corresponding jack, to present the heel blank clamped thereby continuously to the cutter commencing with a corner at the front of the heel blank, then along its corresponding side to its back, and finally along its opposite side to its opposite corner at its front, a cam shaft for supporting any of a plurality of differently shaped cams each operable in opposition to the action of the yieldingly biasing means to actuate the cutter at the operating station transversely to the said circular path of travel of the jacks to cause the cutter to cut the heel blanks presented thereto by the jacks to different shapes as determined by the different shapes of the different cams, and means for rotating the cam shaft once corresponding to each presentation to the cutter at the operating station of a heel blank by a jack.

47. A heel-making machine provided with a loading station and an operating station having, in combination, a rotatable table, a plurality of rotatable heel-blank-clamping jacks mounted to rotate with the table adapted to be successively supplied with heel blanks at the loading station, the jacks being ineffective to clamp the heel blanks at the loading station, means for rendering the jacks successively effective to clamp the heel blanks at a predetermined point in the path of rotation of the table between the loading station and the operating station, a cutter for cutting the clamped heel blanks disposed at the operating station, the cutter being substantially immovable along but being movable transversely to the circular path of travel of the jacks determined by the rotation of the table, means for yieldingly biasing the cutter in one direction of movement transverse to the said circular path of travel of the jacks, means for ratating the table in order to carry the jacks successively from the loading station toward, past and away from the cutter at the operating station, thereby to present the heel blanks clamped by the jacks successively to the cutter at the operating station, means controlled in accordance with the travel of the jacks along the said circular path and operable as each jack approaches and moves past and away from the cutter to rotate the corresponding jack in the neighborhood of the operating station continuously in the same direction and, during such rotation of the corresponding jack, to present the heel blank clamped thereby continuously to the cutter commencing with a corner at the front of the heel blank, then along its corresponding side to its back, and finally along its opposite side to its opposite corner at its front, a cam shaft for supporting any of a plurality of differently shaped cams each operable in opposition to the action of the yieldingly biasing means to actuate the cutter at the operating station transversely to the said circular path of travel of the jacks to cause the cutter to cut the heel blanks presented thereto by the jacks to different shapes as determined by the different shapes of the different cams, means for rotating the cam shaft once corresponding to each presentation to the cutter at the operating station of a heel blank by a jack, and means for rendering the jacks successively ineffective at a second predetermined point in the path of rotation of the table after they have traveled past the cutter at the operating station to release the heel blanks after they have been cut by the cutter.

GEORGE R. CONSTANTINE.
ARTHUR F. BALL.

REFERENCES CITED

The following references are of record in the file of this patent:

UNITED STATES PATENTS

| Number | Name | Date |
|---|---|---|
| 1,630,561 | Fowler | May 31, 1927 |
| 2,026,040 | Howe | Dec. 31, 1935 |
| 2,045,390 | Howe | June 23, 1936 |
| 2,076,123 | Gialdini | Apr. 6, 1937 |
| 2,104,183 | Brostrom | Jan. 4, 1938 |